(12) United States Patent
Lyu et al.

(10) Patent No.: US 12,557,102 B2
(45) Date of Patent: Feb. 17, 2026

(54) SYSTEMS AND METHODS FOR CONFIGURING SYMBOL AND SYMBOL BLOCK PARAMETERS IN WIRELESS COMMUNICATION

(71) Applicant: Huawei Technologies Co., Ltd., Shenzhen (CN)

(72) Inventors: Yongxia Lyu, Shenzhen (CN); Jianglei Ma, Ottawa (CA); Ming Jia, Ottawa (CA); Liqing Zhang, Ottawa (CA); Peiying Zhu, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 48 days.

(21) Appl. No.: 18/627,138

(22) Filed: Apr. 4, 2024

(65) Prior Publication Data
US 2024/0349282 A1  Oct. 17, 2024

Related U.S. Application Data

(63) Continuation of application No. 17/077,464, filed on Oct. 22, 2020, now Pat. No. 11,991,692.
(Continued)

(51) Int. Cl.
| | |
|---|---|
| *H04W 72/1273* | (2023.01) |
| *H04L 27/26* | (2006.01) |
| *H04W 72/0446* | (2023.01) |
| *H04W 72/23* | (2023.01) |
| *H04W 76/27* | (2018.01) |
| *H04W 80/02* | (2009.01) |

(52) U.S. Cl.
CPC ..... *H04W 72/1273* (2013.01); *H04L 27/2607* (2013.01); *H04W 72/0446* (2013.01); *H04W 72/23* (2023.01); *H04W 76/27* (2018.02); *H04W 80/02* (2013.01)

(58) Field of Classification Search
CPC . H04W 72/1273; H04W 76/27; H04W 72/23; H04W 27/2607; H04W 72/0446; H04W 80/02
USPC .......................................................... 370/329
See application file for complete search history.

(56) References Cited

U.S. PATENT DOCUMENTS

| | | | |
|---|---|---|---|
| 10,616,886 B2 * | 4/2020 | Marinier | ............... H04L 5/0053 |
| 2008/0080627 A1 | 4/2008 | Korhonen et al. | |
| | | (Continued) | |

FOREIGN PATENT DOCUMENTS

| | | | | |
|---|---|---|---|---|
| CA | 3114643 A1 * | 4/2020 | ............ | H04W 72/23 |
| EP | 3327972 A1 | 5/2018 | | |
| | (Continued) | | | |

OTHER PUBLICATIONS

"Tao et al., Wireless Positioning Measurement, Nov. 9, 2021, CN 113632549" (Year: 2019).*
(Continued)

*Primary Examiner* — Yemane Mesfin
(74) *Attorney, Agent, or Firm* — Slater Matsil, LLP

(57) ABSTRACT

Current frame structures in Long-Term Evolution (LTE) and New Radio (NR) place some restrictions on the symbols transmitted in the frame, e.g. restrictions related to the duration of each symbol. Embodiments are disclosed in which multi-carrier symbols and/or single-carrier symbol blocks have configurable parameters, such as configurable length and/or configurable location.

20 Claims, 13 Drawing Sheets

Related U.S. Application Data

(60) Provisional application No. 62/991,834, filed on Mar. 19, 2020, provisional application No. 62/939,207, filed on Nov. 22, 2019.

(56) References Cited

U.S. PATENT DOCUMENTS

| | | | |
|---|---|---|---|
| 2010/0085955 A1 | 4/2010 | Luo et al. | |
| 2010/0265896 A1* | 10/2010 | Park | H04W 72/21 |
| | | | 370/329 |
| 2012/0033587 A1 | 2/2012 | Papasakellariou et al. | |
| 2013/0016765 A1 | 1/2013 | Park et al. | |
| 2013/0235851 A1 | 9/2013 | Abu-Surra et al. | |
| 2017/0072307 A1 | 3/2017 | Perry et al. | |
| 2017/0374664 A1 | 12/2017 | Kimura et al. | |
| 2018/0262313 A1 | 9/2018 | Nam et al. | |
| 2018/0270800 A1* | 9/2018 | Park | H04W 72/23 |
| 2018/0279326 A1* | 9/2018 | Park | H04L 5/0096 |
| 2019/0081832 A1 | 3/2019 | Marinier et al. | |
| 2019/0132829 A1 | 5/2019 | Bhattad et al. | |
| 2020/0100273 A1* | 3/2020 | Gao | H04L 27/2656 |
| 2020/0145137 A1 | 5/2020 | Handte et al. | |
| 2020/0204320 A1* | 6/2020 | Yum | H04L 5/0048 |
| 2020/0221438 A1* | 7/2020 | Wu | H04W 74/0808 |
| 2020/0374054 A1 | 11/2020 | Shattil | |
| 2020/0389344 A1* | 12/2020 | Xu | H04L 27/2602 |
| 2020/0396754 A1 | 12/2020 | Wu et al. | |
| 2021/0274568 A1 | 9/2021 | Sengupta et al. | |

FOREIGN PATENT DOCUMENTS

| | | | | |
|---|---|---|---|---|
| EP | 3352397 A1 | | 7/2018 | |
| EP | 3504829 A1 | | 7/2019 | |
| EP | 3529945 B1 | * | 4/2020 | H04L 5/0057 |
| JP | 2018528649 A | | 9/2018 | |
| JP | 2018196005 A | | 12/2018 | |
| WO | 2017112694 A1 | | 6/2017 | |
| WO | 2017204285 A1 | | 11/2017 | |

OTHER PUBLICATIONS

Wang, A Forming Filter Roll-off Coefficient Estimation Method, Feb. 1, 2012, CN102571033 (Year: 2012).

Liangping Ma et al., "Cyclic Prefix Adaptation with Constant Overall Symbol Time for DFT-spread-OFDM and OFDM", IEEE, May 15-18, 2016, 5 pages.

"3rd Generation Partnership Project; Technical Specification Group Radio Access Network; NR; Physical channels and modulation (Release 15)", Technical specification, 3GPP TS 38.211 V15.6.0, Jun. 2019, 97 pages.

* cited by examiner

SYSTEMS AND METHODS FOR CONFIGURING SYMBOL AND SYMBOL BLOCK PARAMETERS IN WIRELESS COMMUNICATION

This application is a continuation of U.S. patent application Ser. No. 17/077,464, filed on Oct. 22, 2020, now U.S. patent Ser. No. 11/991,692 issued on May 21, 2024, entitled "Systems and Methods for Configuring Symbol and Symbol Block Parameters in Wireless Communication," which claims the benefit of U.S. Provisional Patent Application No. 62/939,207, filed on Nov. 22, 2019, entitled "Flexible Frame Structure for Wireless Communication," and of U.S. Provisional Patent Application No. 62/991,834, filed on Mar. 19, 2020, entitled "Systems and Methods for Configuring Symbol and Symbol Block Parameters in Wireless Communication," applications of which are hereby incorporated by reference in their entireties.

TECHNICAL FIELD

The present application relates to wireless communication, and more specifically to configuring parameters of a symbol and/or symbol block, such as duration and/or location of the symbol or symbol block.

BACKGROUND

In some wireless communication systems, user equipments (UEs) wirelessly communicate with one or more base stations. A wireless communication from a UE to a base station is referred to as an uplink communication. A wireless communication from a base station to a UE is referred to as a downlink communication. Resources are required to perform uplink and downlink communications. For example, a base station may wirelessly transmit data to a UE in a downlink communication at a particular frequency for a particular duration of time. The frequency and time duration are examples of resources.

Time-frequency resources are allocated for communications between UEs and a base station. Multiple access occurs when more than one UE is scheduled on a set of time-frequency resources. Each UE uses a portion of the time-frequency resources to receive data from the base station in the case of a downlink communication, or to transmit data to the base station in the case of an uplink communication.

A frame structure is a feature of the wireless communication physical layer that defines a time domain signal transmission structure, e.g. to allow for timing reference and timing alignment of basic time domain transmission units. Wireless communication between UEs and one or more base stations occur on time-frequency resources governed by a frame structure. The frame structure may sometimes instead be called a radio frame structure.

Current frame structures in Long-Term Evolution (LTE) and New Radio (NR) place some restrictions on the symbols transmitted in the frame, e.g. restrictions related to the duration of each symbol. For example, in the NR frame structure, time domain granularity is limited by orthogonal frequency-division multiplexing (OFDM) symbol duration, and limits are placed on the length of the cyclic prefix (CP).

SUMMARY

Embodiments are disclosed in which multi-carrier symbols and/or single-carrier symbol blocks have configurable parameters, such as configurable length and/or configurable location, thereby allowing for more flexibility in the scheduling and transmission of the symbols and/or symbol blocks, thus satisfying the requirements of different services. The configurable location may be in the frequency domain (e.g. configurable frequency location) and/or in the time domain (e.g. configurable location in time, such in relation to a reference point in a frame).

In some embodiments, the multi-carrier symbols and/or single-carrier symbol blocks may be transmitted in a frame structure that also has certain parameters that are configurable relative to previous NR or LTE frame structures. For example, the following parameters of the frame may be configurable: length of the frame, and/or length of a subframe (if a subframe is even defined), and/or length of a slot, and/or number of symbols or symbol blocks in a slot (if a slot is even defined), and/or length of downlink/uplink switching gap length, etc.

Establishing parameters that are configurable, such as configurable length and/or location of a symbol or a symbol block, may allow for a single frame to accommodate many different application scenarios, e.g. autonomous vehicle communication, smart meters, device-to-device communication via a sidelink channel, delay tolerant communications, delay-sensitive (e.g. low latency) communications, etc. Multiple application scenarios may even be possible within the same frame, depending upon the implementation.

However, having configurable parameters, such as configurable length and/or location of a symbol or a symbol block, results in increased control signaling overhead compared to if the parameters were not configurable. This is because the configuration needs to be communicated from the base station to the UE(s).

Embodiments herein aim to provide signaling that allows for the configuration of certain symbol and/or symbol block parameters. Some embodiments also aim to implement the configuration in a way that tries to reduce signaling overhead. For example, in some embodiments a base station may be able to schedule symbols and/or symbol blocks of different lengths in a same frame, and the signaling overhead to allow for such flexibility may be kept relatively small, e.g. by only having to signal a selection of one of a predefined number configurations that are known in advance by the UEs and base station.

In some embodiments, a method may include receiving control signaling configuring at least one parameter of a single-carrier symbol and/or multi-carrier symbol. The method may further include receiving a scheduling grant that schedules the single-carrier symbol and/or multi-carrier symbol for transmission. The method may further include transmitting or receiving the single-carrier symbol and/or multi-carrier symbol according to the scheduling grant and the at least one parameter. Examples of the at least one parameter are disclosed herein, e.g. the at least one parameter may be number of data symbols and/or occupied bandwidth and/or IDFT size, etc. In some embodiments, the control signaling is at least one of: DCI, RRC signaling, and/or MAC layer signaling. For example, a first one or more parameters may be configured in RRC signaling, and a second one or more parameters may be configured in DCI. In some embodiments, the method may operate in a grant-free transmission scheme (i.e. a transmission scheme without a dynamic scheduling grant), in which case the step of receiving the scheduling grant may be omitted. Instead, a grant-free uplink transmission may be transmitted from the UE(s) according to the at least one parameter. In some embodiments, an apparatus or network device is configured to perform the methods disclosed herein.

Although the embodiments below will primarily be discussed in the context of downlink and uplink communications between UEs and a base station, the embodiments also apply to sidelink communications between two UEs. The embodiments are also applicable to various different applications, such as satellite communication and/or Internet of Vehicle (IoV).

Note that "length" and "duration" (or "time duration") will be used interchangeably herein. The word "length" refers to length in the time domain, i.e. length in time. Also, "control signaling" and "signaling" will be used interchangeably herein.

BRIEF DESCRIPTION OF THE DRAWINGS

Embodiments will be described, by way of example only, with reference to the accompanying figures wherein.

DETAILED DESCRIPTION

For illustrative purposes, specific example embodiments will now be explained in greater detail below in conjunction with the figures.

Example Communication Systems and Devices

Figure 1:
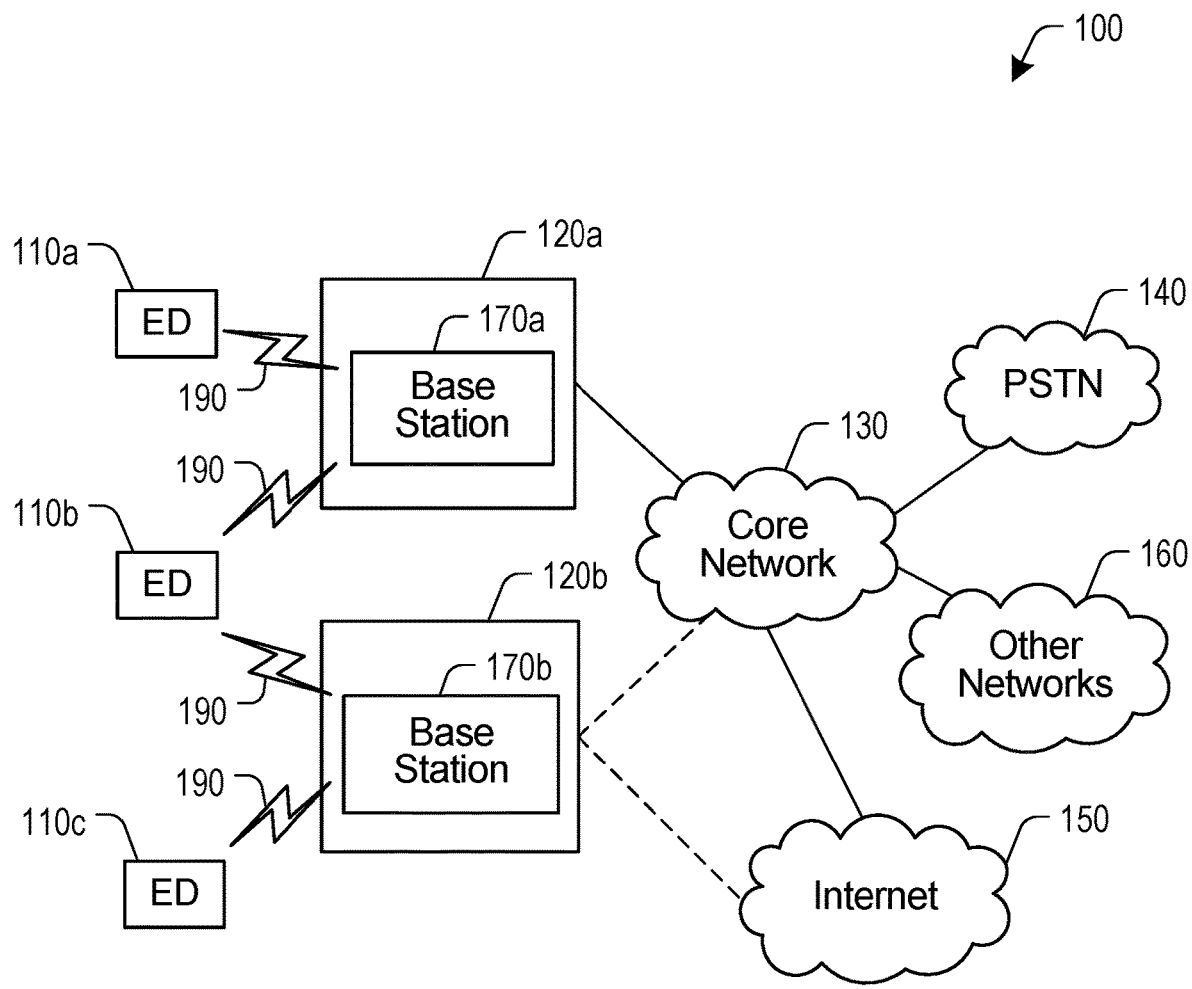
FIG. 1 is a network diagram of an example communication system.

FIG. 1 illustrates an example communication system 100. In general, the communication system 100 enables multiple wireless or wired elements to communicate data and other content. The purpose of the communication system 100 may be to provide content, such as voice, data, video, and/or text, via broadcast, narrowcast, user device to user device, etc. The communication system 100 may operate by sharing resources, such as bandwidth.

In this example, the communication system 100 includes electronic devices (ED) 110a-110c, radio access networks (RANs) 120a-120b, a core network 130, a public switched telephone network (PSTN) 140, the internet 150, and other networks 160. Although certain numbers of these components or elements are shown in FIG. 1, any reasonable number of these components or elements may be included in the communication system 100.

The EDs 110a-110c are configured to operate, communicate, or both, in the communication system 100. For example, the EDs 110a-110c are configured to transmit, receive, or both via wireless or wired communication channels. Each ED 110a-110c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 1, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the internet 150, and/or the other networks 160. For example, the base stations 170a-170b may include (or be) one or more of several well-known devices, such as a base transceiver station (BTS), a Node-B (NodeB), an evolved NodeB (eNodeB or eNB), a Home eNodeB, a gNodeB, a transmission point (TP), a site controller, an access point (AP), or a wireless router. Any ED 110a-110c may be alternatively or additionally configured to interface, access, or communicate with any other base station 170a-170b, the internet 150, the core network 130, the PSTN 140, the other networks 160, or any combination of the preceding. The communication system 100 may include RANs, such as RAN 120b, wherein the corresponding base station 170b accesses the core network 130 via the internet 150.

The EDs 110a-110c and base stations 170a-170b are examples of communication equipment that can be configured to implement some or all of the functionality and/or embodiments described herein. In the embodiment shown in FIG. 1, the base station 170a forms part of the RAN 120a, which may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b transmits and/or receives wireless signals within a particular geographic region or area, sometimes referred to as a "cell" or "coverage area". A cell may be further divided into cell sectors, and a base station 170a-170b may, for example, employ multiple transceivers to provide service to multiple sectors. In some embodiments there may be established pico or femto cells where the radio access technology supports such. In some embodiments, multiple transceivers could be used for each cell, for example using multiple-input multiple-output (MIMO) technology. The number of RAN 120a-120b shown is exemplary only. Any number of RAN may be contemplated when devising the communication system 100.

The base stations 170a-170b communicate with one or more of the EDs 110a-110c over one or more air interfaces 190 using wireless communication links e.g. radio frequency (RF), microwave, infrared (IR), etc. The air interfaces 190 may utilize any suitable radio access technology. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as HSPA, HSPA+ optionally including HSDPA, HSUPA or both. Alternatively, a base station 170a-170b may establish an air interface 190 with Evolved UTMS Terrestrial Radio Access (E-UTRA) using LTE, LTE-A, and/or LTE-B. It is contemplated that the communication system 100 may use multiple channel access functionality, including such schemes as described above. Other radio technologies for implementing air interfaces include IEEE 802.11, 802.15, 802.16, CDMA2000, CDMA2000 1×, CDMA2000 EV-DO, IS-2000, IS-95, IS-856, GSM, EDGE, and GERAN. Other multiple access schemes and wireless protocols may be utilized.

The RANs 120a-120b are in communication with the core network 130 to provide the EDs 110a-110c with various services such as voice, data, and other services. The RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the internet 150, and the other networks 160). In addition, some or all of the EDs 110a-110c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as IP, TCP, UDP. EDs 110a-110c may be multimode devices capable of operation according to multiple radio access technologies, and incorporate multiple transceivers necessary to support such.

Figure 2:
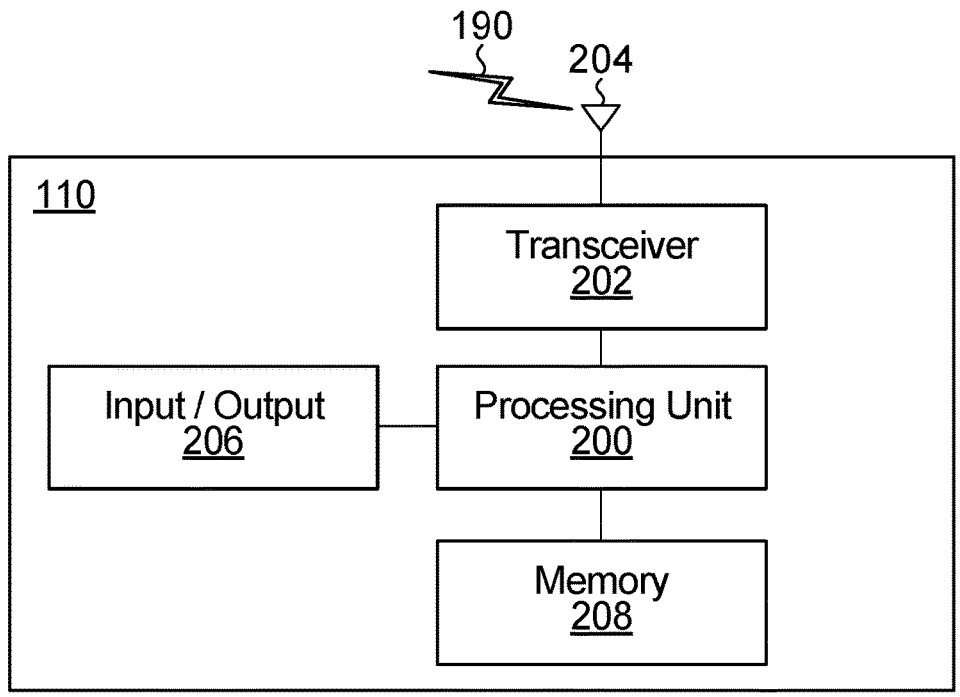
FIG. 2 is a block diagram of an example electronic device.
Figure 3:
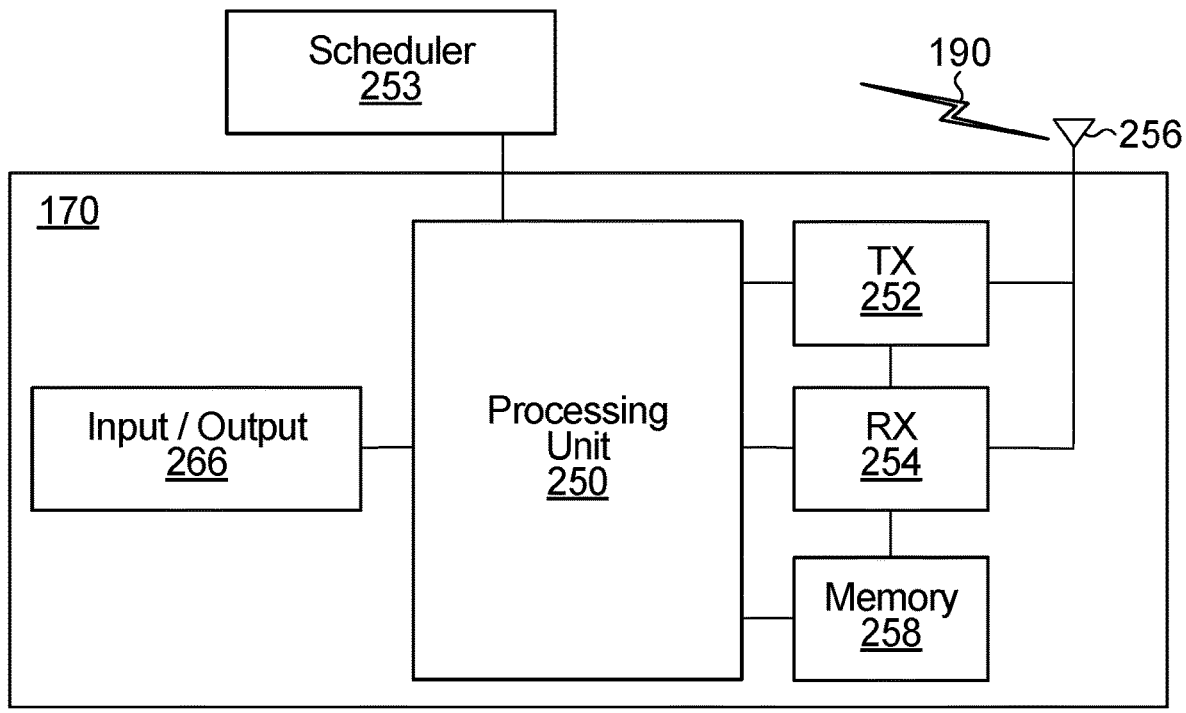
FIG. 3 is a block diagram of another example electronic device.

FIGS. 2 and 3 illustrate example devices that may implement the methods and teachings according to this disclosure. In particular, FIG. 2 illustrates an example ED 110, and FIG. 3 illustrates an example base station 170. These components could be used in the communication system 100 or in any other suitable system.

As shown in FIG. 2, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the communication system 100. The processing unit 200 may also be configured to implement some or all of the functionality and/or embodiments described in more detail herein. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna 204 or Network Interface Controller (NIC). The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110. One or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet 150). The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software instructions or modules configured to implement some or all of the functionality and/or embodiments described herein and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 3, the base station 170 includes at least one processing unit 250, at least one transmitter 252, at least one receiver 254, one or more antennas 256, at least one memory 258, and one or more input/output devices or interfaces 266. A transceiver, not shown, may be used instead of the transmitter 252 and receiver 254. A scheduler 253 may be coupled to the processing unit 250. The scheduler 253 may be included within or operated separately from the base station 170. The processing unit 250 implements various processing operations of the base station 170, such as signal coding, data processing, power control, input/output processing, or any other functionality. The processing unit 250 can also be configured to implement some or all of the functionality and/or embodiments described in more detail herein. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s) such as those described above in connection to the ED 110. The memory 258 stores instructions and data used, generated, or collected by the base station 170. For example, the memory 258 could store software instructions or modules configured to implement some or all of the functionality and/or embodiments described above and that are executed by the processing unit(s) 250.

Each input/output device 266 permits interaction with a user or other devices in the network. Each input/output device 266 includes any suitable structure for providing information to or receiving/providing information from a user, including network interface communications.

Figure 4:
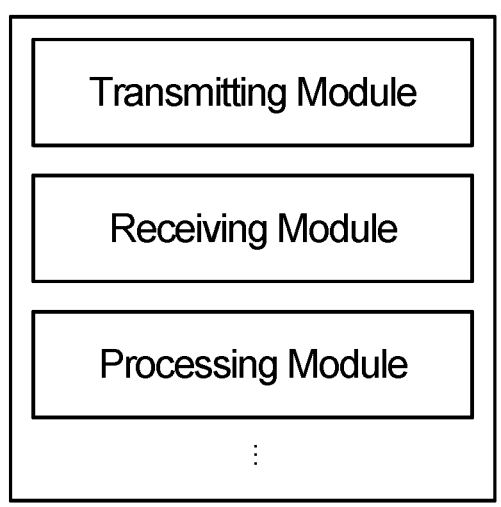
FIG. 4 is a block diagram of example component modules.

One or more steps of the embodiment methods provided herein may be performed by corresponding units or modules, according to FIG. 4. FIG. 4 illustrates units or modules in a device, such as in ED 110 or base station 170. For example, a signal may be transmitted by a transmitting unit or a transmitting module. A signal may be received by a receiving unit or a receiving module. A signal may be processed by a processing unit or a processing module. The processing module may encompass the units/modules described later, in particular the processor 210 or processor 260. Other units/modules may be included in FIG. 4, but are not shown. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Additional details regarding the EDs 110 and the base stations 170 are known to those of skill in the art. As such, these details are omitted here for clarity.

Figure 5:
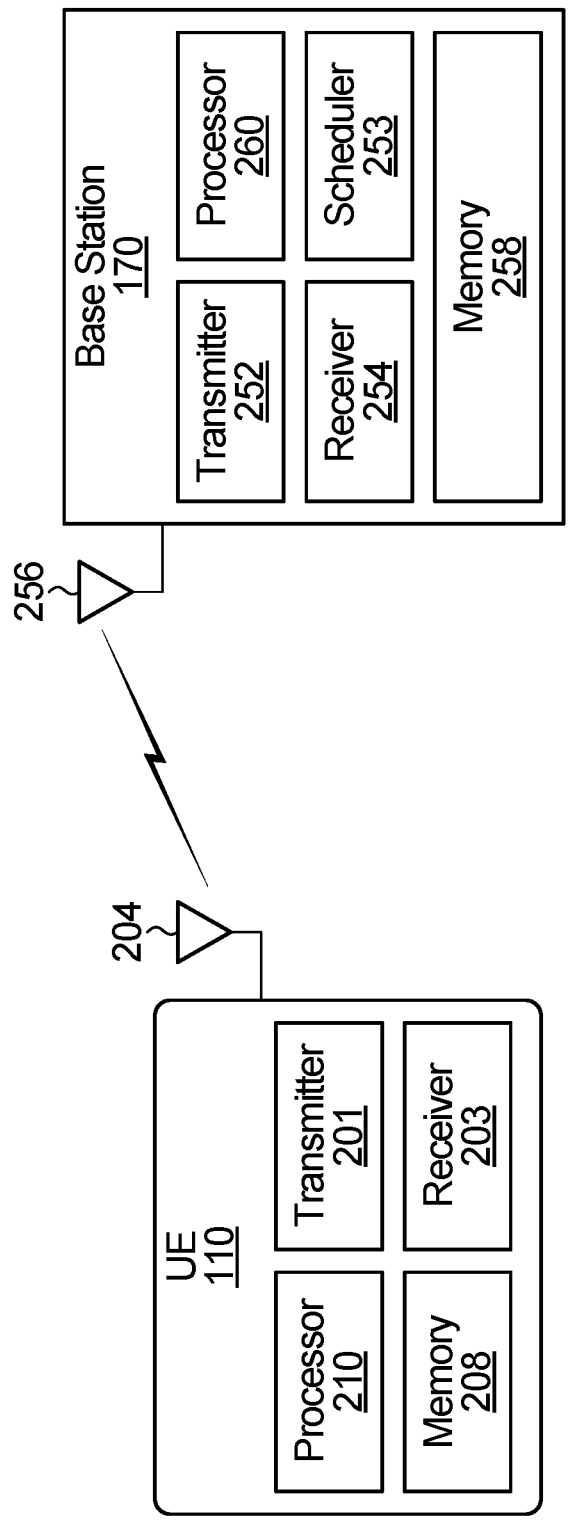
FIG. 5 is a block diagram of an example user equipment and base station.

FIG. 5 illustrates another example of an ED 110 and a base station 170. The ED 110 will hereafter be referred to as a user equipment (UE) 110 or apparatus 110.

The base station 170 may be called other names in some implementations, such as a transmit and receive point (TRP), a base transceiver station, a radio base station, a network node, a network device, a transmit/receive node, a Node B, an evolved NodeB (eNodeB or eNB), a gNB, a relay station, or a remote radio head. In some embodiments, the parts of the base station 170 may be distributed. For example, some of the modules of the base station 170 may be located remote from the equipment housing the antennas of the base station 170, and may be coupled to the equipment housing the antennas over a communication link (not shown). Therefore, in some embodiments, the term base station 170 may also refer to modules on the network side that perform processing operations, such as resource allocation (scheduling), message generation, and encoding/decoding, and that are not necessarily part of the equipment housing the antennas of the base station 170. The modules may also be coupled to other base stations. In some embodiments, the base station 170 may actually be a plurality of base stations that are operating together to serve the UE 110, e.g. through coordinated multipoint transmissions. Also, the term "base station" is used herein to refer to a network device, i.e. a device on the network side.

The base station 170 includes a transmitter 252 and a receiver 254 coupled to one or more antennas 256. Only one antenna 256 is illustrated. The transmitter 252 and the receiver 254 may be integrated as a transceiver. The base station 170 further includes a processor 260 for performing operations including those related to preparing a transmission for downlink transmission to the UE 110, and those related to processing uplink transmissions received from the UE 110. Processing operations related to preparing a transmission for downlink transmission include operations such as encoding, modulating, precoding (e.g. MIMO precoding), and generating the single-carrier symbol blocks and multi-carrier symbols described herein. Processing operations related to processing uplink transmissions include demodulating and decoding the single-carrier symbol blocks and multi-carrier symbols described herein. The processor 260 may configure (e.g. select) the parameters of the single-carrier symbol blocks and multi-carrier symbols, and generate signaling to indicate the parameters to the UE 110. The signaling is then sent by the transmitter 252. The base station 170 further includes a scheduler 253, which may schedule the uplink resources to be allocated to UE 110 for uplink transmission of single-carrier symbol blocks and multi-carrier symbols, and which may also schedule downlink resources for downlink transmission of single-carrier symbol blocks and multi-carrier symbols. The scheduler 253 may configure (if not done by the processor 260) and schedule single-carrier symbol blocks and multi-carrier symbols having different parameters, e.g. symbols and/or symbol blocks of different lengths and/or at different frequency locations, as —described herein. The scheduler 253 may generate the control signaling described herein. The base station 100 further includes a memory 258 for storing information and data.

Although not illustrated, the processor 260 may form part of the transmitter 252 and/or receiver 254. Also, although not illustrated, the processor 260 may implement the scheduler 253.

The processor 260, the scheduler 253, and the processing components of the transmitter 252 and receiver 254 may each be implemented by the same or different one or more processors that are configured to execute instructions stored in a memory (e.g. in memory 258). Alternatively, some or all of the processor 260, the scheduler 253, and the processing components of the transmitter 252 and receiver 254 may be implemented using dedicated circuitry, such as a programmed field-programmable gate array (FPGA), a graphical processing unit (GPU), or an application-specific integrated circuit (ASIC).

The UE 110 also includes a transmitter 201 and a receiver 203 coupled to one or more antennas 204. Only one antenna 204 is illustrated. The transmitter 201 and the receiver 203 may be integrated as a transceiver, e.g. transceiver 202 of FIG. 2. The UE 110 further includes a processor 210 for performing operations including those related to preparing a transmission for uplink transmission to the base station 170, and those related to processing downlink transmissions received from the base station 170. Processing operations related to preparing a transmission for uplink transmission include operations such as encoding, modulating, and generating the single-carrier symbol blocks and multi-carrier symbols described herein. Processing operations related to processing downlink transmissions include demodulating and decoding the single-carrier symbol blocks and multi-carrier symbols described herein. The processor 210 may extract signaling from a downlink transmission (e.g. by decoding the signaling) in order to determine parameters of the single-carrier symbol blocks and multi-carrier symbols, e.g. in order to determine the duration and location of symbols or symbol blocks that are or will be scheduled. The transmission or reception of the single-carrier symbol blocks and multi-carrier symbols is in accordance with a scheduling grant issued by the scheduler and in accordance with the configured parameters of the single-carrier symbol block and/or multi-carrier symbol scheduled by the scheduling grant. For example, if the UE 110 receives a transmission from the base station 170 having a scheduling grant, and the scheduling grant indicates that the transmission of a single-carrier symbol block and/or multi-carrier symbol will begin at a particular time-frequency location, then the UE 110 will transmit or receive that single-carrier symbol block and/or multi-carrier symbol beginning at that time-frequency location. If control signaling is also received by the UE 110 that indicates that the single-carrier symbol block and/or multi-carrier symbol will have a particular parameter, e.g. particular duration, then the UE 110 will transmit or receive that single-carrier symbol block and/or multi-carrier symbol according to that duration. The base station 100 further includes a memory 208 for storing information and data.

Although not illustrated, the processor 210 may form part of the transmitter 201 and/or receiver 203.

The processor 210, and the processing components of the transmitter 201 and receiver 203 may each be implemented by the same or different one or more processors that are configured to execute instructions stored in a memory (e.g. in memory 208). Alternatively, some or all of the processor 210, and the processing components of the transmitter 201 and receiver 203 may be implemented using dedicated circuitry, such as a FPGA, a GPU, or an ASIC.

In some embodiments, the UE 110 is not necessarily a smartphone, but could instead be any terminal device, e.g. an Internet of Things (IoT) device, a wearable device, a vehicular device, a vehicle-mounted device, vehicle on-board equipment, etc.

The base station 170 and the UE 110 may include other components, but these have been omitted for the sake of clarity.

Transmission in a Frame

A frame structure defines a time domain signal transmission structure, e.g. to allow for timing reference and timing alignment of basic time domain transmission units. Wireless communication between UEs and one or more base stations occur on time-frequency resources that may be governed by a frame structure.

Figure 6:
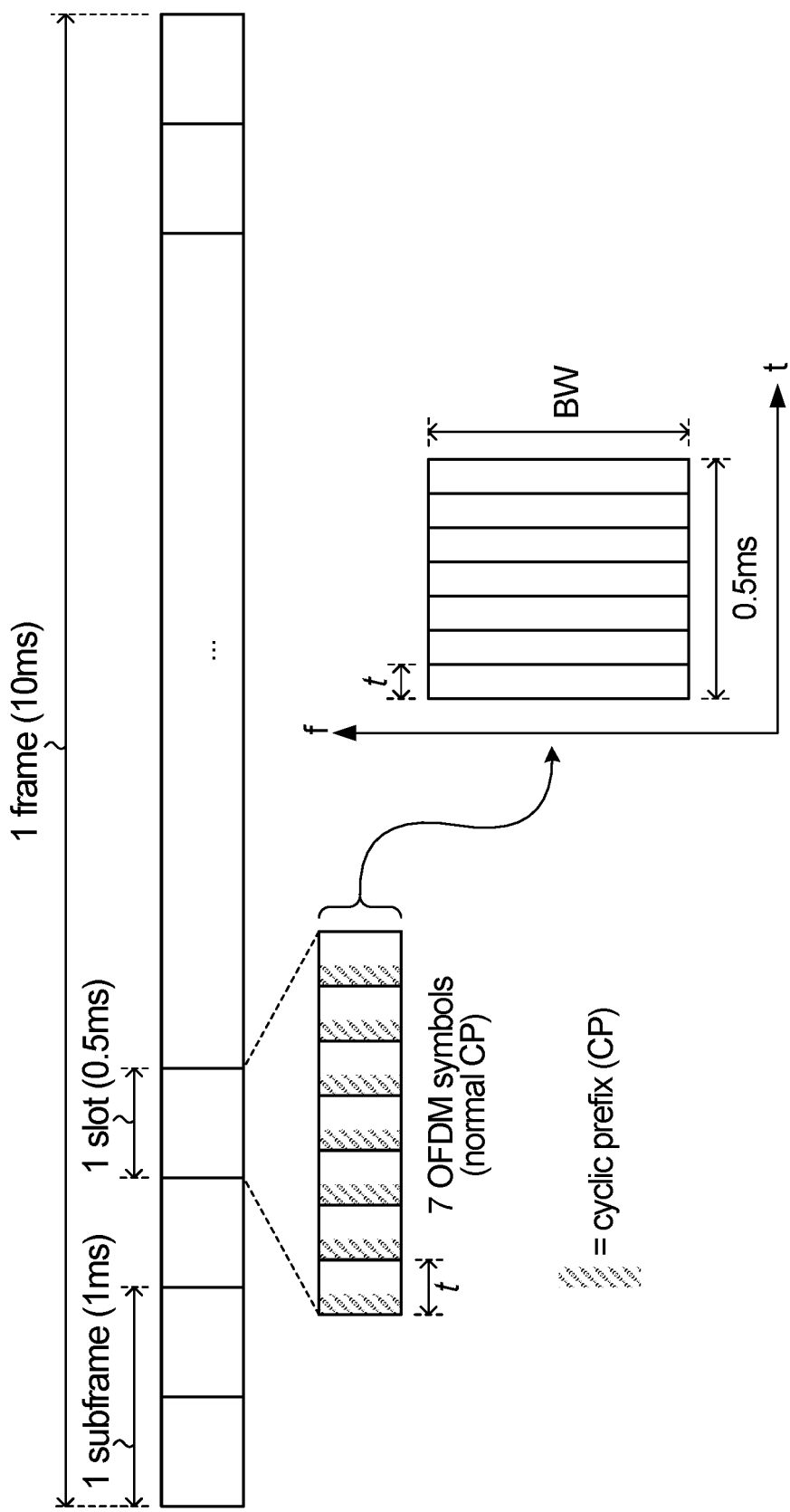
FIG. 6 illustrates an example frame structure in LTE.

One example of a frame structure is illustrated in FIG. 6. The frame structure in FIG. 6 is one example type of frame structure in LTE. The frame structure in FIG. 6 has the following structure: each frame is 10 ms in duration; each frame has 10 subframes, which are each 1 ms in duration; each subframe includes two slots, each of which is 0.5 ms in duration; each slot is for transmission of 7 OFDM symbols (assuming normal CP); each OFDM symbol has a symbol duration t and a particular bandwidth (or partial bandwidth or bandwidth partition) related to the number of subcarriers and subcarrier spacing. The frame structure of FIG. 6 places limitations on time domain scheduling and duration of symbols, e.g. time domain granularity is limited by OFDM symbol duration, and limits are placed on the length of the CP.

Figure 7:
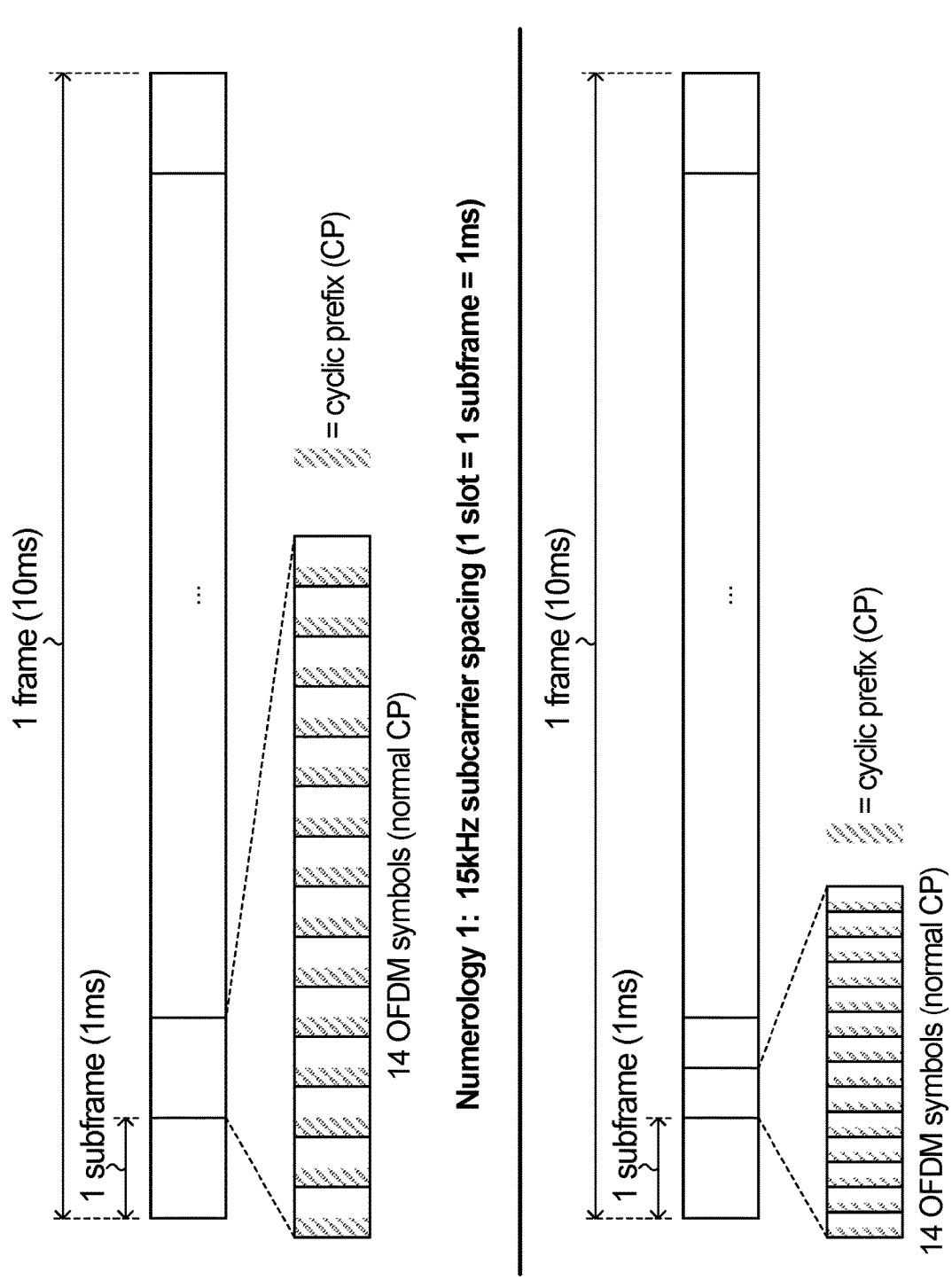
FIG. 7 illustrates an example frame structure in NR.

Another example of a frame structure is that defined in NR. In NR, multiple subcarrier spacings are supported, each subcarrier spacing corresponding to a respective numerology. The frame structure depends on the numerology, but in any case the frame length is set at 10 ms, and consists of ten subframes of 1 ms each. A slot is defined as 14 OFDM symbols, and slot length depends upon the numerology. For example, FIG. 7 illustrates the NR frame structure for normal CP 15 kHz subcarrier spacing ("numerology 1") and the NR frame structure for normal CP 30 kHz subcarrier spacing ("numerology 2"). For 15 kHz subcarrier spacing a slot length is 1 ms, and for 30 kHz subcarrier spacing a slot length is 0.5 ms.

The NR frame structure may have more flexibility than the LTE frame structure, but the NR frame structure still places notable limitations on time domain scheduling and duration of symbols. For example, time domain granularity is limited by OFDM symbol duration, and there are limited CP length options. The minimum time duration that can be reserved is limited to one OFDM symbol (or a multiple of OFDM symbols), and the actual time duration (i.e. length) of an OFDM symbol is scalable (inversely scaled) with pre-defined subcarrier spacing options (15 kHz, 30 kHz, 60 kHz, etc.). Valid symbol duration in an OFDM symbol is fixed for given sub-carrier spacing. To meet the requirements of this fixed spacing, there is a fixed normal CP and corresponding valid symbol duration for most of the sub-carrier spacings. Extended CP is only configurable for 60 KHz subcarrier spacing. The fixed valid symbol duration in NR and limited normal CP/extended CP options may not meet the different requirements of different service scenarios.

Embodiments are instead disclosed herein in which there is more flexibility in configuring and scheduling symbols and/or symbol blocks of different durations and/or at different locations (time and/or frequency locations). This may allow for the requirements of different service scenarios to be accommodated in a single frame structure, perhaps even within a same frame. For example, low latency and delay-tolerant applications may possibly both be accommodated within a same frame. The frame structure within which the symbols and/or symbol blocks are transmitted will be referred to herein as a "flexible frame structure". The flexible frame structure has more flexibility than the LTE and NR frame structures, at least because there is more flexibility in the duration and/or time location and/or frequency location of symbols and/or symbol blocks scheduled in the frame. Control signaling is disclosed for configuring the symbol and/or symbol block parameters, such as configuring the duration and/or time location and/or frequency location of the symbols and/or symbol blocks. In some embodiments, the control signaling is designed to have relatively low overhead.

The flexible frame structure may optionally have other parameters that are configurable, e.g. length of the frame, and/or length of a subframe (if a subframe is even defined), and/or length of a slot, and/or number of symbols or symbol blocks in a slot (if a slot is even defined), and/or length of downlink/uplink switching gap length, etc.

Single-carrier symbol blocks having flexible parameters that can be configured will first be discussed, followed by multi-carrier symbols.

Configurable Single-Carrier Symbol Blocks

Figure 8:
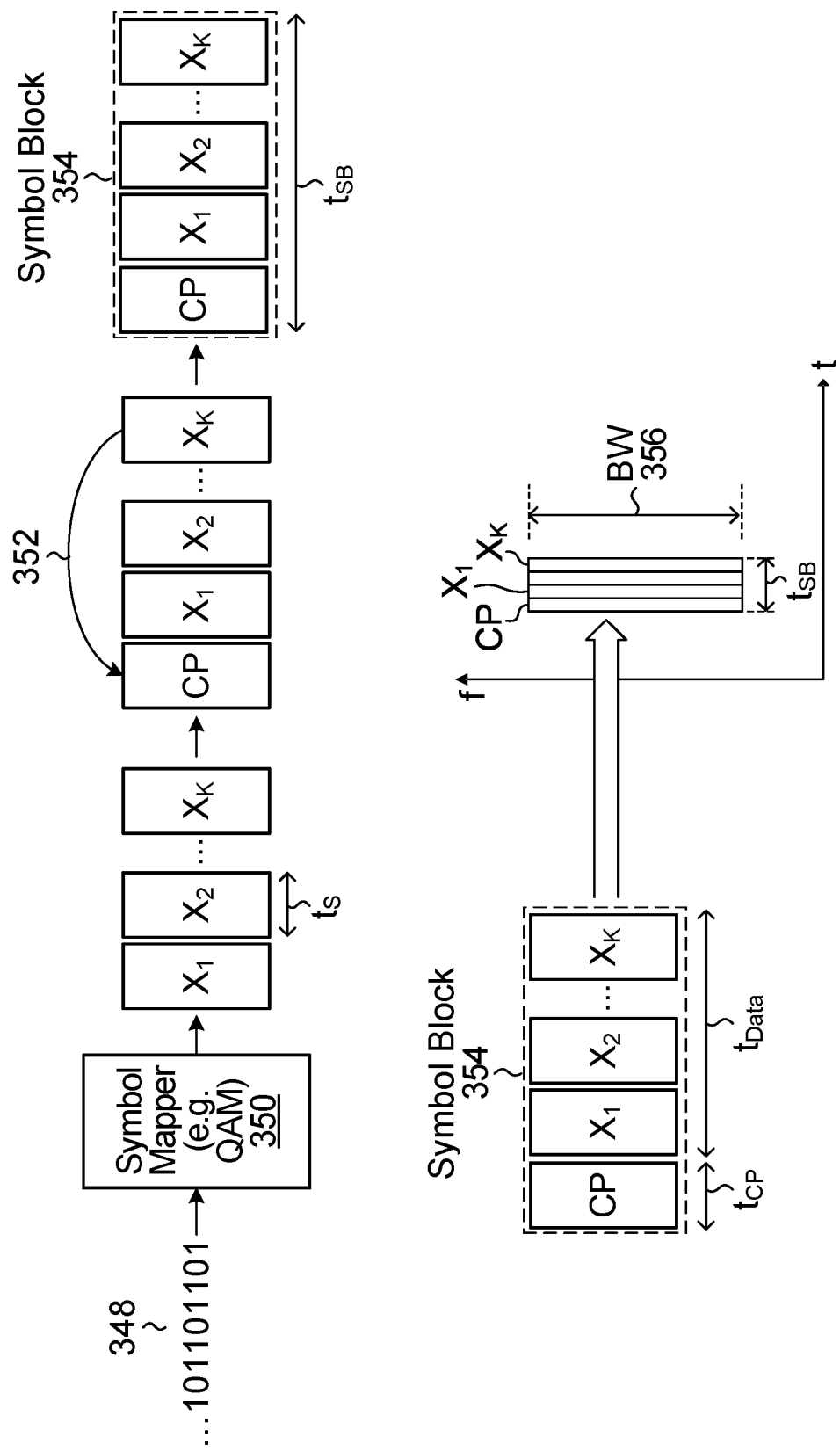
FIG. 8 illustrates generation of a single-carrier symbol block, according to one embodiment.

FIG. 8 illustrates generation of a single-carrier symbol block, according to one embodiment. A plurality of bits 348 are mapped by a symbol mapper 350 to one or more data symbols $X_1$ to $X_K$. K is a natural number greater or equal to one. Each data symbol has a symbol duration $t_s$. The symbol duration may alternatively be referred to as the symbol interval or the pulse interval. K data symbols may alternatively be referred to as K pulses. The symbol mapper 350 may be implemented by a modulator (e.g. by processor 210 or 260, or modules/units/circuitry). One example type of modulation that may be implemented by the symbol mapper 350 is quadrature amplitude modulation (QAM), in which case each one of the one or more data symbols $X_1$ to $X_K$ is a QAM symbol that carries two or more bits of the plurality of bits 348, depending upon the constellation order. A CP is optionally added in front of the one or more data symbols $X_1$ to $X_K$, as shown at 352, e.g. to assist with equalization in the frequency domain. The content of the CP may be a repeat of one or some of the data symbol content, e.g. a repeat of one or more data symbols present at the end of the symbol block, as shown at 352, in which case the symbols carrying the CP may be called "CP symbols". A symbol block 354 is thereby generated that includes the CP and the K data symbols, e.g. with the CP at the start of the symbol block 354, as illustrated. The CP portion has duration $t_{CP}$, and the data portion has duration $t_{Data}$, which together make up the symbol block 354 duration $t_{SB}=t_{CP}+t_{Data}$. The symbol block 354 is transmitted over a particular occupied bandwidth, as shown at 356. The symbol block 354 may be transmitted in the uplink or the downlink. The components illustrated and operations described in relation to FIG. 8 may be implemented by processor 210 if the symbol block 354 is an uplink transmission sent by the UE 110, or may be implemented by processor 260 if the symbol block 354 is a downlink transmission sent by the base station 170.

In FIG. 8, the symbol block 354 is single-carrier, i.e. a single-carrier waveform is used. That is, the CP and data symbols are all transmitted on the same single frequency, one after the other in time, as illustrated in FIG. 8. The single-carrier symbol block 354 illustrated in FIG. 8 includes a CP. Alternatively, a CP can be omitted from a single-carrier symbol block 354, i.e. $t_{CP}=0$.

In some embodiments, one or more of the following parameters of the single-carrier symbol block 354 may be configurable and may possibly be changed from one symbol block (or one group of symbol blocks) to the next:

(1) The number of symbols K transmitted in a symbol block may be configurable. For example, it may be desirable to change K during operation based upon the application scenario. For example, a longer symbol block length, which may be generated using a larger K, may be used to reduce pilot and CP overhead. However, in low latency applications a longer symbol block length may not be desirable, e.g. in a low latency application the data should be decoded sooner, which favours having a shorter symbol block length, e.g. a smaller K. Therefore, in some application scenarios (e.g. low latency applications) it may be desirable to have a smaller K, and in other application scenarios (e.g. delay-tolerant applications) it may be desirable to have a larger K. The following is a non-exhaustive list of example ways in which the number of symbols K may be communicated to a UE for one or more single-carrier symbol blocks scheduled in the downlink and/or uplink:
  (a) K may be signaled by the base station dynamically, e.g. in downlink control information (DCI). For example, the value of K for a symbol block may be dynamically signaled by the base station when scheduling that symbol block.
  (b) K may be signaled by the base station semi-statically, e.g. in radio resource control (RRC) signaling or in the medium access control (MAC) layer. For example, the value of K may remain constant for several frames, subframes, or slots, and when the value of K is changed it is done so via RRC signaling or MAC layer information.
  (c) K may be predefined based on the application scenario, e.g. K is predefined as being a particular (smaller) number for a low latency application and K is predefined as being a particular (larger) number for a delay-tolerant application. The predefined values of K may be fixed or configured semi-statically. In some embodiments, the UE knows the value of K based on the application scenario and the value of K might therefore not need to even be explicitly communicated to the UE.
  (d) K may be determined by the UE as a function of other parameters that are known by the UE. For example, the value(s) of K may be predefined based on the frequency band or carrier frequency on which the UE operates. As another example, the value(s) of K may be predefined based on the location in time and/or frequency of the scheduled symbol block.
  (e) K may be fixed, e.g. by a standard.

(2) The CP length $t_{CP}$ of a single-carrier symbol block may be configurable. The CP length may be signaled as an absolute length, or as a ratio of CP length $t_{CP}$ to data portion length $t_{Data}$ (e.g. ratio of CP over valid symbol block length), or as a ratio of CP length $t_{CP}$ to total symbol block duration $t_{SB}$. Depending upon the application scenario and/or channel, it may be desirable to have a long CP length, a short CP length, or no CP (i.e. $t_{CP}=0$). The following is a non-exhaustive list of example ways in which the CP length may be communicated to a UE for one or more single-carrier symbol blocks scheduled in the downlink and/or uplink:
  (a) The CP length may be signaled by the base station dynamically, e.g. in DCI. For example, the CP length for a symbol block may be dynamically signaled by the base station when scheduling that symbol block.
  (b) The CP length may be signaled by the base station semi-statically, e.g. in RRC signaling or in the MAC layer. For example, the CP length may remain constant for several frames, subframes, or slots, and when the CP length is changed it is done so via RRC signaling or MAC layer information.
  (c) The CP length may be predefined based on the application scenario, e.g. CP length is predefined as being one particular length for certain application scenarios and another particular length for other application scenarios. In some embodiments, the UE knows the CP length based on the application scenario and the CP length might therefore not need to even be explicitly communicated to the UE.
  (d) The CP length may be a function of channel conditions, in which case the CP length may not need to be explicitly communicated to the UE, e.g. if the UE and the base station are both able to determine (or be informed of) the channel conditions and if there is a predefined mapping between different channel conditions and different CP lengths.
  (e) The CP length may be determined by the UE as a function of other parameters that are known by the UE. For example, the CP length may be predefined based on the value of K, and/or based on the frequency band or carrier frequency on which the UE operates, and/or based on the location in time and/or frequency of the scheduled symbol block, etc.
  (f) The CP length may be fixed, e.g. by a standard.

(3) The occupied bandwidth of a single-carrier symbol block may be configurable. The single-carrier waveform occupies a certain bandwidth, referred to as the occupied bandwidth, e.g. occupied bandwidth 356 of symbol block 354 of FIG. 8. The occupied bandwidth may be a function of the symbol duration $t_s$ of each of the symbols in the symbol block, as well as a roll off factor. For example, the occupied bandwidth may be related to the symbol duration and roll off factor as follows: occupied $BW=(1+\alpha)/t_s$, where $t_s$ is the symbol duration of each symbol in the symbol block and a is the roll off factor. $\alpha$ is a real number and $0 \leq \alpha \leq 1$. The roll off factor impacts the peak-to-average power ratio (PAPR). When the roll off factor is large (e.g. $\alpha=1$), the PAPR of the waveform is small, but the occupied bandwidth is large. When the roll off factor is small, the occupied bandwidth is small, but the PAPR of the waveform is high. The roll off factor may impact the total symbol block duration $t_{SB}$. For example, for a conventional single carrier waveform, e.g. based on root-raised cosine (RRC) impulse response, the symbol block duration $t_s$ may be $t_{CP}+K^*t_s+y^*t_s$, where y is associated with the roll off factor, e.g. y=2 when $\alpha=1$. The occupied bandwidth may be signaled directly, or computed by the UE if the UE knows the symbol duration $t_s$ and the roll off factor $\alpha$. For example, the symbol duration $t_s$ may be signaled to the UE, the roll off factor $\alpha$ may be predefined (e.g. fixed in a standard), and so the UE may determine the occupied bandwidth based on the signaled symbol duration $t_s$ and the predefined roll off factor $\alpha$. The following is a is a non-exhaustive list of example ways in which the occupied bandwidth may be communicated to a UE for one or more single-carrier symbol blocks scheduled in the downlink and/or uplink:

(a) The occupied bandwidth may be signaled by the base station dynamically, e.g. in DCI. For example, the occupied bandwidth for a symbol block may be dynamically signaled by the base station when scheduling that symbol block.

(b) The occupied bandwidth may be signaled by the base station semi-statically, e.g. in radio RRC signaling or in the MAC layer. For example, the occupied bandwidth may remain constant for several frames, subframes, or slots, and when the value of the occupied bandwidth is changed it is done so via RRC signaling or MAC layer information.

(c) The occupied bandwidth may be predefined based on the application scenario, e.g. the occupied bandwidth is predefined as being one value for certain scenarios and another value for other scenarios. In some embodiments, the UE knows the occupied bandwidth based on the application scenario and the occupied bandwidth might therefore not need to even be explicitly communicated to the UE.

(d) The occupied bandwidth may be determined by the UE as a function of other parameters that are known by the UE. For example, the occupied bandwidth may be computed by the UE based on the symbol duration $t_s$ and the roll off factor $\alpha$. The symbol duration $t_s$ and the roll off factor $\alpha$ may both be signaled to the UE (e.g. in DCI, RRC, or MAC layer), or one may be predefined and the other signaled (e.g. the roll off factor may be predefined and the symbol duration may be signaled in DCI, RRC, or MAC layer). In some embodiments, the occupied bandwidth may be predefined based on parameters such as the frequency band or carrier frequency on which the UE operates, and/or based on the location in time and/or frequency of the scheduled symbol block, etc.

(e) The occupied bandwidth may be fixed, e.g. by a standard.

(4) The symbol duration $t_s$ of the data symbols of a single-carrier symbol block may be configurable. The following is a non-exhaustive list of example ways in which the symbol duration $t_s$ may be communicated to a UE for one or more single-carrier symbol blocks scheduled in the downlink and/or uplink:

(a) The symbol duration $t_s$ of each data symbol in the symbol block may be signaled by the base station dynamically, e.g. in DCI. For example, the symbol duration for a symbol block may be dynamically signaled by the base station when scheduling that symbol block.

(b) The symbol duration $t_s$ of each data symbol in the symbol block may be signaled by the base station semi-statically, e.g. in radio RRC signaling or in the MAC layer. For example, the symbol duration may remain constant for several frames, subframes, or slots, and when the value of the symbol duration is changed it is done so via RRC signaling or MAC layer information.

(c) The symbol duration $t_s$ of each data symbol in the symbol block may be predefined based on the application scenario, e.g. the symbol duration is predefined as being one value for certain scenarios and another value for other scenarios. In some embodiments, the UE knows the symbol duration based on the application scenario and the symbol duration might therefore not need to even be explicitly communicated to the UE.

(d) The symbol duration $t_s$ of each data symbol in the symbol block may be determined by the UE as a function of other parameters that are known by the UE. For example, the symbol duration may be computed by the UE based on the occupied bandwidth and the roll off factor $\alpha$, e.g. using the equation occupied $BW=(1+\alpha)/t_s$. The occupied bandwidth and the roll off factor $\alpha$ may both be signaled to the UE (e.g. in DCI, RRC, or MAC layer), or one may be predefined and the other signaled (e.g. the roll off factor may be predefined and the occupied bandwidth may be signaled in DCI, RRC, or MAC layer). In some embodiments, the symbol duration may be predefined based on parameters such as the frequency band or carrier frequency on which the UE operates, and/or based on the location in time and/or frequency of the scheduled symbol block, etc.

(e) The symbol duration $t_s$ of each data symbol in the symbol block may be fixed, e.g. by a standard.

(5) The roll off factor $\alpha$ of the data symbols of a single-carrier symbol block may be configurable. Knowledge of the roll off factor by the UE may assist with implementing matched filtering at the receiver. The following is a is a non-exhaustive list of example ways in which the roll off factor may be communicated to a UE for one or more single-carrier symbol blocks scheduled in the downlink and/or uplink:

(a) The roll off factor $\alpha$ of the data symbols of the symbol block may be signaled by the base station dynamically, e.g. in DCI. For example, the roll of factor for a symbol block may be dynamically signaled by the base station when scheduling that symbol block.

(b) The roll off factor $\alpha$ of the data symbols of the symbol block may be signaled by the base station semi-statically, e.g. in radio RRC signaling or in the MAC layer. For example, the roll off factor may remain constant for several frames, subframes, or slots, and when the value of the roll off factor is changed it is done so via RRC signaling or MAC layer information.

(c) The roll off factor $\alpha$ of the data symbols of the symbol block may be predefined based on the application scenario, e.g. the roll off factor is predefined as being one value for certain scenarios and another value for other scenarios. In some embodiments, the UE knows the roll off factor based on the application scenario and the symbol duration might therefore not need to even be explicitly communicated to the UE.

(d) The roll off factor α of the data symbols of the symbol block may be determined by the UE as a function of other parameters that are known by the UE. For example, the roll off factor may be computed by the UE based on the occupied bandwidth of the symbol block and the symbol duration $t_s$ of each data symbol in the symbol block, e.g. using the equation occupied BW= $(1+α)/t_s$. The occupied bandwidth and the symbol duration $t_s$ may both be signaled to the UE (e.g. in DCI, RRC, or MAC layer), or one may be predefined and the other signaled (e.g. the symbol duration $t_s$ may be predefined and the occupied bandwidth may be signaled in DCI, RRC, or MAC layer). In some embodiments, the roll off factor may be predefined based on parameters such as the frequency band or carrier frequency on which the UE operates, and/or based on the location in time and/or frequency of the scheduled symbol block, etc.

(e) The roll off factor α of the data symbols of the symbol block may be fixed, e.g. by a standard.

In addition to the possible configurable symbol block parameters (1) to (5) discussed above, the UE must also know the location in the frequency domain at which a single-carrier symbol block transmission is to occur. The frequency location of the single-carrier symbol block should be known by the UE, but in some embodiments the frequency location may still be configurable.

Figure 9:
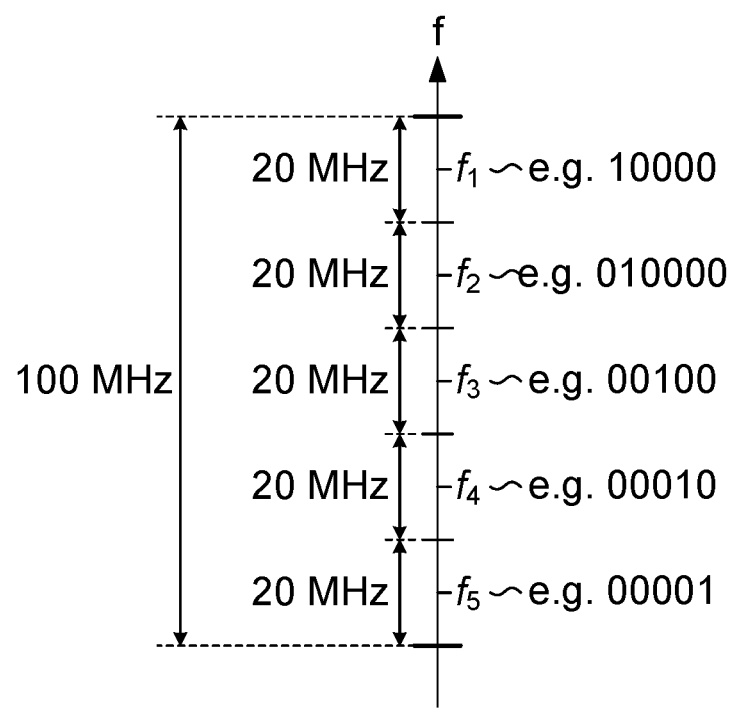
FIG. 9 illustrates a bandwidth partitioned into five bandwidth parts (BWPs), according to one embodiment.

For example, the single-carrier frequency at which the symbols of the symbol block are transmitted may be configured, e.g. so that the symbol block is transmitted at particular time-frequency resources that do not overlap with other time-frequency resources at which another symbol or symbol block is being transmitted. The single-carrier frequency may be the center frequency of the occupied bandwidth. In some embodiments, for a particular carrier frequency at which communication occurs there is an associated bandwidth. The associated bandwidth may be partitioned into different bandwidth parts (BWPs). Each BWP may have an associated frequency location (e.g. center of the BWP) at which the single-carrier frequency may be located. The multiple possible single-carrier frequencies (each in a respective BWP) may be predefined, and the base station signals which one of the single-carrier frequencies will be used for a particular one or more symbol blocks, e.g. using a bit map. For example, FIG. 9 illustrates a 100 MHz bandwidth associated with a particular carrier frequency. The bandwidth is partitioned into five BWPs, each of 20 MHz. At the center of each BWP is a single-carrier frequency at which a single-carrier symbol block may possibly be transmitted. The five possible single-carrier frequencies are labelled as $f_1$ to $f_5$ in FIG. 9. The frequency location of the five different single-carrier frequencies are known in advance by the UE. The particular single-carrier frequency at which a particular symbol block is scheduled may be communicated to the UE using a bit map, e.g. five bits where each bit represents a respective different one of the five possible single-carrier frequencies, as shown in FIG. 9. By using a bitmap with five bits, then more than one single-carrier frequency may be communicated at time. Otherwise, three bits may be used, e.g. 001=$f_1$, 010=$f_2$, 011=$f_3$, 100=$f_4$, and 101=$f_5$. FIG. 9 is just one example. More generally, the following is a non-exhaustive list of example ways in which the frequency location of a single-carrier frequency may be communicated to a UE for one or more single-carrier symbol blocks scheduled in the downlink and/or uplink:

(a) The frequency location may be signaled by the base station dynamically, e.g. in DCI. For example, the frequency location for a symbol block (e.g. the bit map in FIG. 9) may be dynamically signaled by the base station when scheduling that symbol block.

(b) The frequency location may be signaled by the base station semi-statically, e.g. in radio RRC signaling or in the MAC layer. For example, the frequency location may remain constant for several frames, subframes, or slots, and when the value of the frequency location is changed it is done so via RRC signaling or MAC layer information (e.g. the bitmap in FIG. 9 is transmitted in RRC signaling or as part of MAC layer information).

(c) The frequency location may be predefined based on the application scenario, e.g. the frequency location is predefined as being one value for certain scenarios and another value for other scenarios. In some embodiments, the UE knows the frequency location based on the application scenario and the frequency location might therefore not need to even be explicitly communicated to the UE.

(d) The frequency location may be determined by the UE as a function of other parameters that are known by the UE. For example, the frequency location may be a predefined based on parameters such as the time at which the symbol block is scheduled. For example, the frequency location may hop as a function of time location of the symbol block in the frame. As another example, the frequency location may be predefined based on occupied bandwidth and/or symbol duration $t_s$ and/or number of symbols K, etc.

(e) The frequency location may be fixed, e.g. by a standard.

The UE must also know the location in the time domain at which a scheduled single-carrier symbol block begins. In some embodiments, the time domain is partitioned into predefined time durations, each one beginning at a particular reference point in time known by both the base station and the UE. In some embodiments, each reference point may be the beginning of a frame, subframe, or slot. In some embodiments, each symbol block is scheduled in relation to one of the reference points. In some embodiments, the symbol block duration may be configured for each duration of time (e.g. for each subframe or slot), but once configured the symbol block duration does not change during that duration of time (e.g. a symbol block duration does not change within a subframe or slot).

Figure 10:
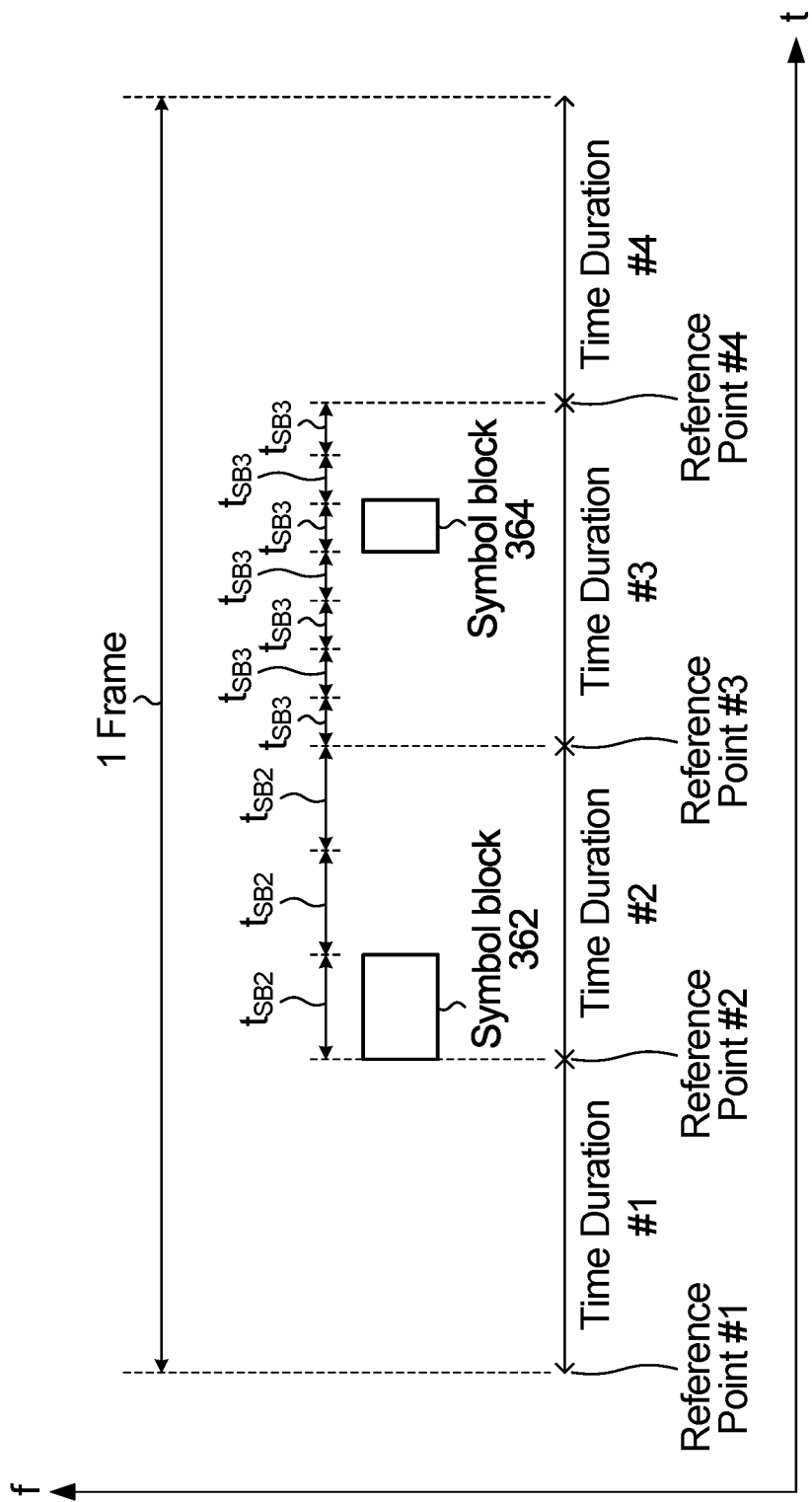
FIG. 10 illustrates a frame partitioned into four time durations, according to one embodiment.

For example. FIG. 10 illustrates a frame partitioned into four time durations #1 to #4, each beginning at a respective reference point. A time duration may instead be called a time window. The four reference points may each be at the start of a subframe or slot, although this is not necessary, e.g. the concept of subframe and/or slot may not even be defined. The duration of the single-carrier symbol blocks transmitted in each time duration may be configurable, but within a particular time duration the duration of each single-carrier symbol block is the same. A single-carrier symbol block is scheduled in the time domain, e.g. using DCI or RRC signaling, by indicating an offset from one of the reference points. For example, single-carrier symbol block 362 in FIG. 10 is scheduled in the time domain by indicating to the UE that the symbol block 362 is within time duration #2 with no offset, i.e. the symbol block 362 begins at the start of time duration #2. As another example, single-carrier symbol block 364 in FIG. 10 is scheduled in the time domain by indicating to the UE that the symbol block 364 is within time duration #3 offset five symbol block durations from the beginning of the time duration (i.e. offset five symbol block durations from reference point #3). The symbol block duration for a particular time duration (e.g. $t_{SB2}$ for time duration #2 and $t_{SB3}$ for time duration #3) may be configured for each time duration, with the switch happening at the reference point. In some embodiments, the configurable symbol block parameters, e.g. the symbol block duration, for each time duration in a frame may be signaled at the start of the frame. These configurable symbol block parameters may change on a frame-by-frame basis, or remain the same for a particular number of frames (e.g. only be reconfigured once every 10 frames).

In some embodiments, the time domain resource allocation indicated by a base station may be for one or multiple single-carrier symbol block durations $t_{SB}$, and the time domain resource allocation may use a legacy method, e.g. signal the start symbol and length, possibly listed in one row with one index in a table.

In some embodiments, some or all of the configurable parameters may only change at a reference point. For example, one, some, or all of the following parameters may only change at a reference point: symbol block duration, number of symbols K transmitted in a symbol block, CP length $t_{CP}$ of a symbol block, occupied bandwidth of a symbol block, symbol duration $t_s$ of the data symbols of a symbol block, roll off factor α, and/or frequency location of the symbol block. Therefore, in some embodiments, within each time duration interposed between two reference points, one or more parameters of symbol blocks scheduled within that time duration may be configurable, but the configuration is the same for all symbol blocks scheduled within that time duration. This may allow for simpler implementation because the base station and UE both know that the configuration is the same for all symbol blocks scheduled within a time duration, and so the configuration only needs to be signaled by the base station once for all symbol blocks within a time duration.

Although FIG. 10 shows a frame partitioned into four different time durations, the number of time durations is not limited to four, and may be predefined or configurable. Also, although FIG. 10 shows a frame that is partitioned into different time durations, instead a subframe or a slot may be partitioned into different time durations and scheduled in the same manner as described in relation to FIG. 10, except on a slot-by-slot or subframe-by-subframe basis, rather than on a frame-by-frame basis.

In some embodiments, the multiple reference points in time may be predefined (e.g. in a standard). In some embodiments, for a frame length F, the reference points may be 0 (i.e. frame starting time), 1/10F, 2/10F, 3/10F, 4/10F, 5/10F, 6/10F, 7/10F, 8/10F, 9/10F, 10/10F, where 10/10F, is the starting time of the next frame. In some embodiments, for a frame length F, the reference points may be 0 (i.e. frame starting time), 1/NF, 2/NF, ..., N−1/NF, N/NF, where N/NF is the starting time of the next frame, and where N may be predefined or fixed (e.g. in a standard) or signaled from base station by semi-static signaling (e.g. RRC) or dynamic signaling (e.g. DCI). If N=1 then there is a single configuration that is the same for all symbol blocks within a same frame, but that configuration may change frame-to-frame. In some embodiments, N is limited to an integer greater than zero.

In some embodiments, the base station and the UE will use the closest reference point after receiving the related signaling. In other embodiments, the base station will indicate the reference point (or corresponding time duration) for which the new parameters apply. The reference point (or corresponding time duration) may be indicated along with the new parameters that are configured for that time duration corresponding to that reference point.

In some embodiments, there are multiple reference points in time, but the unit of reference point is in sample duration instead of fraction of a frame, subframe, or slot. For example, a reference point in time may be present every 0, $nT_s$, $2nT_s$, ..., $(P-1)nT_s$, $PnT_s$. $T_s$ is the sample duration, e.g. 1/sample frequency, where by way of example the sample frequency may be 1966.08 MHz. n defines the time duration between two reference points as a function of sample duration, e.g. if n=2 then each reference point is two sample durations apart, thereby defining each time duration as two sample durations. In some embodiments, n may be predefined or fixed (e.g. in a standard) or signaled from base station by semi-static signaling (e.g. RRC) or dynamic signaling (e.g. DCI). In some embodiments, n is limited to an integer greater than zero. P is the periodicity at which the set of reference points repeat. P may be an integer or a real number greater than zero. In one example, $PnT_s$=1 ms, i.e. the set of reference points are defined over 1 ms. The set of reference points may repeat/restart every 1 ms.

Some specific example ways to signal configurable single-carrier symbol block parameters will now be explained. In the examples below, the configurable single-carrier symbol block parameters may be configured for one, several, or each time duration interposed between two reference points. Parameters that are not signaled in the embodiments below may be predefined, e.g. fixed or predefined based on the application scenario or location in the frame, etc.

In some embodiments, each configurable parameter is signaled separately, which provides a lot of flexibility, but may have large signaling overhead. For example, one, some or all of the following parameters may be separately signaled: symbol block duration, number of symbols K transmitted in a symbol block, CP length $t_{CP}$ of a symbol block, occupied bandwidth of a symbol block, symbol duration $t_s$ of the data symbols of a symbol block, roll off factor α, and/or frequency location of the symbol block.

In some embodiments, different parameter configurations may be signaled for different application scenarios. For example, a smaller value of K may be signaled for a symbol block for a low latency communication. As another example, a different values of the roll off factor may be signaled depending upon the scenario.

In some embodiments, the frequency location of the symbol block (e.g. $f_1$ to $f_5$ in FIG. 9) and the number of data symbols K in the symbol block are signaled in DCI and remaining symbol block parameters are either predefined or semi-statically signaled, e.g. in RRC signaling.

In some embodiments, one parameter is signaled (e.g. number of data symbols K or occupied bandwidth or frequency location) and the other parameters are predefined, e.g. in a standard.

In some embodiments, the occupied bandwidth, roll off factor, and frequency location (e.g. in terms of center frequency of a particular bandwidth partition or BWP) may be signaled.

In some embodiments, the occupied bandwidth or the symbol duration $t_s$ of each data symbol in a symbol block, as well as the number of symbol in the symbol block, may be signaled separately.

In some embodiments, occupied bandwidth for a symbol block is signaled, and quantization methods are used to reduce signaling overhead. For example, three bits may be used by the base station to signal one of four possible occupied bandwidth options: A, 2 A, 3 A, or 4 A, where A is a minimum bandwidth unit. As another example, four bits may be used by the base station to signal one of eight possible occupied bandwidth options: A, 2 A, 3 A, 4 A, 5 A, 6 A, 7 A, or 8 A, where A is a minimum bandwidth unit. A may be predefined or preconfigured in advance, e.g. predefined in the standard. In some embodiments, the value of A may depend upon the frequency band. For example, for a low frequency range FR1, A may be equal to 180 Hz or 200 Hz or 400 Hz, etc. For a medium frequency range FR2, A may be equal to 180 KHz or 200 KHz or 360 kHz, etc. For a large frequency range FR3 (e.g. in the THz range), A may be equal to 100 MHz or 200 KHz, etc. The UE will know the frequency band range (FR1 or FR2 or FR3) in which the UE is operating, but if multiple values of A are possible within a given frequency band range (FR1, FR2, or FR3) then the value of A must be signaled to the UE, e.g. in DCI, RRC, or in the MAC layer.

In some embodiments, the roll off factor for a symbol block is signaled, and quantization methods are used to reduce signaling overhead. For example, two bits may be used to indicate one of four predefined roll off factors: $\alpha=0$ or $\alpha=0.25$ or $\alpha=0.5$ or $\alpha=1$. As another example, three bits may be used to indicate one of eight predefined roll off factors: $\alpha=0$ or $\alpha=0.125$ or $\alpha=0.25$ or $\alpha=0.375$ or $\alpha=0.5$ or $\alpha=0.625$ or $\alpha=0.75$ or $\alpha=1$.

In some embodiments, data symbol duration $t_s$ of data symbols in a symbol block is signaled, and quantization methods are used to reduce signaling overhead. For example, two bits may be used to indicate one of four predefined data symbol durations, three bits may be used to indicate one of eight predefined data symbol durations, etc. In some embodiments, the CP duration is determined by the UE based on ratio of CP over valid symbol block duration. In some embodiments, the ratio may be signaled or predefined.

In some embodiments, to provide some flexibility but also help reduce signaling overhead, a set of different parameter configurations may be predefined, and a selection of one of the parameters configurations may be signaled. For example, two bits may be used to indicate one of four different combination indices, e.g. 00=combination index 0, 01=combination index 1, 10=combination index 2, and 11=combination index 3. Example of parameter configurations that may be signaled for each combination index are shown below in Tables 1 and 2:

TABLE 1

| Combination Index | Number of data symbols K | Roll off factor α | Occupied Bandwidth |
|---|---|---|---|
| 1 | 1 | 1 | 4A |
| 2 | 2 | 0.5 | 3A |
| 3 | 4 | 0.25 | 2A |
| 4 | 8 | 0 | A |

TABLE 2

| Combination Index | Number of data symbols K | Roll off factor α | Data symbol duration $t_s$ |
|---|---|---|---|
| 1 | 1 | 1 | 4T |
| 2 | 2 | 0.5 | 3T |
| 3 | 4 | 0.25 | 2T |
| 4 | 8 | 0 | T |

Table 2 is an alternative to Table 1 in which data symbol duration $t_s$ is signaled instead of occupied bandwidth.

In the example in Table 1 above, if combination index 1 is signaled (e.g. by the base station transmitting bit pair 00), then the UE knows that for the one or more scheduled single-carrier symbol blocks the number of data symbols in each symbol block is one, the roll-off factor for each symbol block is one, and the occupied bandwidth for each symbol block is 4 A, where A is a minimum bandwidth unit known by the base station and UE, e.g. A=200 Hz. As another example, in the example in Table 2 above, if combination index 4 is signaled (e.g. by the base station transmitting bit pair 11), then the UE knows that for the one or more scheduled single-carrier symbol blocks the number of data symbols in each symbol block is 8, the roll-off factor for each symbol block is zero, and the symbol duration of each data symbol of each symbol block is T, where T is a minimum symbol duration unit known by the base station and UE, e.g. T=0.1 ms.

Further examples are shown in are shown below in Tables 3 and 4:

TABLE 3

| Combination Index | Number of data symbols K | Data symbol duration $t_s$ |
|---|---|---|
| 1 | 1 | 4T |
| 2 | 2 | 3T |
| 3 | 4 | 2T |
| 4 | 8 | T |

TABLE 4

| Combination Index | Number of data symbols K | Data symbol duration $t_s$ |
|---|---|---|
| 1 | 1 | T |
| 2 | 2 | T |
| 3 | 3 | 2T |
| 4 | 4 | T |
| 5 | 5 | 2T |
| 6 | 6 | T |
| 7 | 7 | 2T |
| 8 | 8 | 2T |

Tables 3 and 4 are alternatives. To signal the combination index in Table 4, three bits are required to select one of the eight options. Unlike in Table 2, the roll off factor is not configured in Tables 3 and 4. For example, the roll off factor may be configured using other signaling or predefined.

In some embodiments, the combination index selected by the base station for any of Tables 1 to 4 may be signaled by the base station in DCI, or in RRC signaling, or in MAC layer signaling. In one example, the values in the Tables are configured semi-statically using RRC signaling, but the combination index selected is signaled in DCI.

In some embodiments, the combination index selected by the base station for any of Tables 1 to 4 may be signaled in broadcast signaling, e.g. the selected combination index may be broadcast from the base station to all UEs communicating with the base station. In some embodiments, the combination index selected by the base station for any of Tables 1 to 4 may instead be signaled in UE-specific signaling, e.g. if the base station is selecting the combination index for one or more particular UEs that the base station is communicating with.

Configurable Multi-Carrier Symbols

Figure 11:
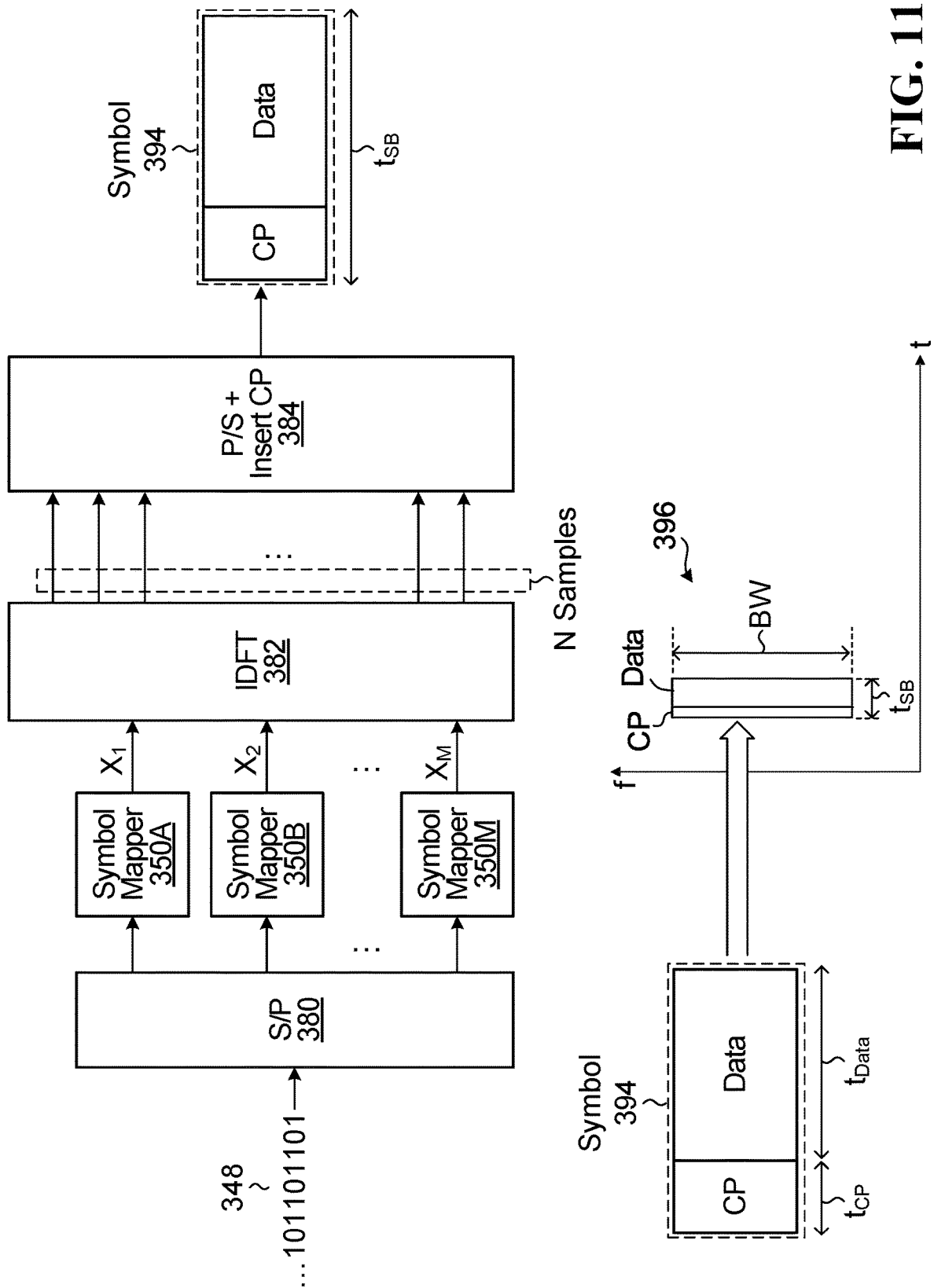
FIG. 11 illustrates generation of a multi-carrier symbol, according to one embodiment.

FIG. 11 illustrates generation of a multi-carrier symbol, according to one embodiment. The multi-carrier symbol may sometimes instead be called a multi-carrier symbol block because, like the single-carrier symbol block described above in relation to FIG. 8, the multi-carrier symbol transmits multiple data symbols. A plurality of bits 348 undergo serial-to-parallel conversion in serial-to-parallel convertor 380 to result in M parallel bit streams, where M is a natural number greater than one. Each parallel bit stream is mapped by a respective symbol mapper 350A-M to result in M data symbols $X_1$ to $X_M$. Each symbol mapper 350A-M may be implemented by a modulator (e.g. by processor 210 or 260, or modules/units/circuitry). One example type of modulation that may be implemented by one or more of the symbol mappers 350A-M is QAM, in which case the resulting data symbol is a QAM symbol that carries two or more bits, depending upon the constellation order. Each data symbol $X_1$ to $X_M$ is for transmission on a respective different carrier frequency (i.e. subcarrier), and the subcarriers have a particular subcarrier spacing. The data symbols $X_1$ to $X_M$ undergo the inverse discrete fourier transform (IDFT) 382 (which may be implemented as an inverse fast fourier transform (IFFT) in some embodiments) to result in N time-domain sample outputs, where N is a natural number typically greater than M, followed by parallel-to-serial conversion and CP insertion. A multi-carrier symbol 394 is thereby generated that includes a redundancy (e.g. CP) portion, and a data portion. The CP portion has duration $t_{CP}$ (also called CP length), and the data portion has duration $t_{Data}$, which together make up the symbol 394 duration $t_{SB}=t_{CP}+t_{Data}$. The CP portion may be a repeat of some of the data portion, e.g. a repeat of the data portion present at the end of the symbol 394. The CP portion may be present at the start of the symbol 394, as illustrated. The data portion of the multi-carrier symbol 394 transmits the data symbols $X_1$ to $X_M$ all in parallel on M different subcarriers having a particular subcarrier spacing. The multi-carrier symbol 394 is transmitted over a particular bandwidth (or partial bandwidth or bandwidth partition), as shown at 396. The bandwidth is dependent upon the subcarrier spacing and the number of subcarriers used, which may occupy part of a designated bandwidth (or bandwidth partition) or a carrier. The multi-carrier symbol 394 may be transmitted in the uplink or the downlink. The components illustrated and operations described in relation to FIG. 11 may be implemented by processor 210 if the symbol 394 is an uplink transmission sent by the UE 110, or may be implemented by processor 260 if the symbol 394 is a downlink transmission sent by the base station 170.

In FIG. 11, the symbol 394 is multi-carrier, i.e. a multi-carrier waveform is used. That is, the CP and data symbols are transmitted on multiple subcarriers, with the data symbols being transmitted in parallel on the multiple subcarriers during the data duration $t_{Data}$.

One example of a multi-carrier symbol is an OFDM symbol.

The size of the IDFT 382 refers to the number of output samples N of the IDFT 382. The size of the IDFT 382 affects the length of the multi-carrier symbol 394. In particular, the larger the size of the IDFT 382 (i.e. the larger N), the longer the duration $t_{SB}$ of the symbol 394 because there are more output samples to be transmitted. The size of the IDFT 382 also directly impacts the number of data symbols (M) that can be transmitted in the symbol 394 and the subcarrier spacing, assuming the bandwidth over which the symbol 394 is transmitted is fixed. A smaller IDFT size N means that fewer data symbols M can be transmitted in the symbol 394, which means the subcarrier spacing is farther apart because fewer subcarriers are being used over the same bandwidth. For example, assume N=1024, M=600, and the subcarrier spacing is 15 kHz. If the IDFT size N is then reduced to N=512, then M=300, which means that half the data symbols are transmitted in the OFDM symbol. If the bandwidth remains the same, then the subcarrier spacing is therefore twice as far apart (to spread the 300 data symbols over the same frequency range as the original 600 data symbols), i.e. the subcarrier spacing is set as 30 kHz.

In some embodiments, the IDFT 382 in FIG. 11 is implemented as an IFFT. However, an IFFT imposes a power-of-two restriction on the IDFT 382 size, i.e. the IDFT 382 size N is a power of two (e.g. N is 512 or 1024 or 2048, etc.). Therefore, an IFFT also imposes a restriction on the length $t_{SB}$ of the symbol 394 and the subcarrier spacing. Scaling can only be on a factor-of-two basis (e.g. subcarrier spacing may be 15 kHz or 30 kHz but not in between, and symbol duration also scales based on this restriction). More generally the power-of-two restriction on IFFT may not be desirable, and therefore IFFT is not necessarily used, e.g. if it is desired to generate a symbol 394 of a certain duration tsp that cannot be obtained using the IFFT.

In some embodiments, the duration of the multi-carrier symbol 394 may be configurable by configuring the CP length ($t_{CP}$) and/or by configuring the IDFT size N. The IDFT size and/or CP length may be configured indirectly by instead configuring the symbol length $t_{SB}$, which may have a known relationship to a particular CP length $t_{CP}$ and/or IDFT size N.

In some embodiments, it may be desirable to change the IDFT size N during operation, e.g. based upon the application scenario. The following is a non-exhaustive list of example ways in which the IDFT size N may be communicated to a UE for one or more multi-carrier symbols scheduled in the downlink and/or uplink:

(a) N may be signaled by the base station dynamically, e.g. in DCI. For example, the value of N for a symbol may be dynamically signaled by the base station when scheduling that symbol.

(b) N may be signaled by the base station semi-statically, e.g. in RRC signaling or in the MAC layer. For example, the value of N may remain constant for several frames, subframes, or slots, and when the value of N is changed it is done so via RRC signaling or MAC layer information.

(c) N may be predefined based on the application scenario, e.g. N is predefined as being a particular (smaller) number for a low latency application and N is predefined as being a particular (larger) number for a delay-tolerant application. The predefined values of N may be fixed or configured semi-statically. In some embodiments, the UE knows the value of N based on the application scenario and the value of N might therefore not need to even be explicitly communicated to the UE.

(d) N may be determined by the UE as a function of other parameters that are known by the UE. For example, the value(s) of N may be predefined based on the frequency band or carrier frequency on which the UE operates. As another example, the value(s) of N may be predefined based on the location in time and/or frequency of the scheduled symbol.
  (e) N may be fixed, e.g. by a standard.
  In some embodiments, it may be desirable to change the CP length $t_{CP}$ during operation, e.g. based upon the application scenario. The CP length may be signaled as an absolute length, or as a ratio of CP length $t_{CP}$ to data portion length $t_{Data}$ (e.g. ratio of CP over valid symbol length), or as a ratio of CP length $t_{CP}$ to total symbol duration $t_{SB}$. Depending upon the application scenario and/or channel, it may be desirable to have a long CP length, a short CP length, or no CP (i.e. $t_{CP}$=0). The following is a non-exhaustive list of example ways in which the CP length may be communicated to a UE for one or more multi-carrier symbols scheduled in the downlink and/or uplink:
  (a) The CP length may be signaled by the base station dynamically, e.g. in DCI. For example, the CP length for a symbol may be dynamically signaled by the base station when scheduling that symbol.
  (b) The CP length may be signaled by the base station semi-statically, e.g. in RRC signaling or in the MAC layer. For example, the CP length may remain constant for several frames, subframes, or slots, and when the CP length is changed it is done so via RRC signaling or MAC layer information.
  (c) The CP length may be predefined based on the application scenario, e.g. CP length is predefined as being a one particular length for certain application scenarios and another particular length for other application scenarios. In some embodiments, the UE knows the CP length based on the application scenario and the CP length might therefore not need to even be explicitly communicated to the UE.
  (d) The CP length may be a function of channel conditions, in which case the CP length may not need to be explicitly communicated to the UE, e.g. if the UE and the base station are both able to determine (or be informed of) the channel conditions and if there is a predefined mapping between different channel conditions and different CP lengths.
  (e) The CP length may be determined by the UE as a function of other parameters that are known by the UE. For example, the CP length may be predefined based on the value of M, and/or based on the value of $t_{Data}$, and/or based on the frequency band or carrier frequency on which the UE operates, and/or based on the location in time and/or frequency of the scheduled symbol, etc.
  (f) The CP length may be fixed, e.g. by a standard.
  Permitting the IDFT size N to be set as any number allows for a lot of flexibility in multi-carrier symbol duration $t_{SB}$, but at the cost of higher signaling overhead and possibly higher implementation complexity at the transmitter and/or receiver because N is not limited to a set of predefined numbers that can be exploited for lower complexity implementation.
  Therefore, in some embodiments, restrictions are still placed on the value of N. As one example, the IDFT size N can be limited to be within a particular range typically feasible to implement in commercial equipment, e.g. $512 \leq N \leq 8192$. Only values of N within this range are signaled by the base station. As another example, N can be limited to a set of values that satisfy a predefined relationship or formula that allows for a lower complexity implementation at the transmitter and/or receiver. For example, a lower complexity implementation may be possible if the values of N satisfy a predefined formula based on multiplied powers of prime numbers, e.g. $N=2^\sigma 3^\beta$ or $N=2^\sigma 3^\beta 5^\mu$, where $\sigma$, $\beta$, and $\mu$ are each an integer greater than or equal to zero. In some embodiments, the base station signals the IDFT size N by signaling the value of integer(s) $\sigma$, $\beta$, and/or $\mu$, and the UE computes N using these variables and a predefined formula. In some embodiments, the value of N itself is signaled by the base station to the UE(s).
  In some embodiments, the IDFT size N is preconfigured as one of four possible sizes, and the base station signals two bits (e.g. in DCI or RRC signaling) indicating a selection of one of the four possible sizes. Two alternative examples are illustrated in Tables 5 and 6 below:

TABLE 5

| Combination Index | N |
|---|---|
| 00 | 512 |
| 01 | 1024 |
| 10 | 2048 |
| 11 | 4096 |

TABLE 6

| Combination Index | N |
|---|---|
| 00 | 1024 |
| 01 | 2048 |
| 10 | 4096 |
| 11 | 8192 |

In some embodiments, the four options in Table 5 or Table 6 may be predefined in a standard or configured by RRC signaling, or possibly even dynamically indicated in DCI. In some embodiments, the selection of a particular one of the four options for a symbol may be signaled by the base station using DCI or RRC signaling.
  In some embodiments, the IDFT size N is preconfigured as one of eight possible sizes, and the base station signals three bits (e.g. in DCI or RRC signaling) indicating a selection of one of the eight possible sizes. An example is illustrated in Table 7 below:

TABLE 7

| Combination Index | N |
|---|---|
| 000 | 1024 |
| 001 | 1536 |
| 010 | 2048 |
| 011 | 3072 |
| 100 | 4096 |
| 101 | 5120 |
| 110 | 6144 |
| 111 | 7168 |

In some embodiments, the eight options in Table 7 may be predefined in a standard or configured by RRC signaling, or possibly even dynamically indicated in DCI. In some embodiments, the selection of a particular one of the eight options for a symbol may be signaled by the base station using DCI or RRC signaling.

Another example is illustrated in Table 8 below:

TABLE 8

| Combination Index | N |
|---|---|
| 000 | d |
| 001 | 2d |
| 010 | 3d |
| 011 | 4d |
| 100 | 3d |
| 101 | 6d |
| 110 | 8d |
| 111 | 9d | d is a number known by the base station and the UE, e.g. d=512. In the specific example in Table 8, the IDFT size N=7d cannot be selected because it does not satisfy the formula $N=2^\alpha 3^\beta$ or $N=2^\alpha 3^\beta 5^\mu$, which in this example is a restriction on the value of N to allow for a possibly lower complexity implementation at the transmitter and/or receiver.

In some embodiments, the eight options in Table 8 may be predefined in a standard or configured by RRC signaling, or possibly even dynamically indicated in DCI. In some embodiments, the selection of a particular one of the eight options for a multi-carrier symbol may be signaled by the base station using DCI or RRC signaling.

Tables 5 to 8 are only examples. In other embodiments the IDFT size N may be signaled using a different number of bits, e.g. one bit if there are only two IDFT size option or more than three bits if there are more than eight IDFT size options.

In some embodiments, the combination index selected by the base station for any of Tables 5 to 8 may be signaled by the base station in DCI, or in RRC signaling, or in MAC layer signaling. In one example, the values in the Tables 5 to 8 are configured semi-statically using RRC signaling, but the combination index selected is signaled in DCI.

In some embodiments, the combination index selected by the base station for any of Tables 5 to 8 may be signaled in broadcast signaling, e.g. the selected combination index may be broadcast from the base station to all UEs communicating with the base station. In some embodiments, the combination index selected by the base station for any of Tables 5 to 8 may instead be signaled in UE-specific signaling, e.g. if the base station is selecting the combination index for one or more particular UEs that the base station is communicating with.

In some embodiments, the full set of possible IDFT sizes may be fixed, e.g. defined in a standard, and the full set may possibly be large, e.g. more than 8 different options for IDFT size. In some such embodiments, RRC signaling may be used to configure the use of one, some, or all possible IDFT sizes. If the RRC signaling only configures one IDFT size for use, then the UE will use that IDFT size. However, if the RRC signaling configures more than one IDFT size, then DCI may be used by the base station to dynamically indicate which one of the configured IDFT sizes is to be used for the UE, e.g. for a given BWP or carrier or frequency band or serving cell.

In some embodiments, a rule known by the UE may be predefined and used to select IDFT size, e.g. the following rule: (1) IDFT size N=512 if the bandwidth of the BWP or carrier or serving cell is less than or equal to 5 MHz; (2) IDFT size N=768 if the bandwidth of the BWP or carrier or serving cell is more than 5 MHz but less than or equal to 8 MHz; (3) IDFT size N=1024 if the bandwidth of the BWP or carrier or serving cell is more than 8 MHz but less than or equal to 10 MHz.

In some embodiments, CP length and/or IDFT size may change from one symbol to another or from one group of symbols to another group of symbols.

In some embodiments, the occupied bandwidth of a multi-carrier symbol may also or instead be signaled. The location of the multi-carrier symbol in the frequency domain also needs to be known by the UE, and in some embodiments this may be configurable and signaled to the UE (e.g. in a manner similar to FIG. 9).

In addition to the example configurable multi-carrier symbol parameters discussed above, the UE must also know the location in the time domain at which a scheduled multi-carrier symbol begins. In some embodiments, the time domain is partitioned into predefined time durations, each one beginning at a particular reference point in time known by both the base station and the UE. In some embodiments, each reference point may be the beginning of a frame, subframe, or slot. In some embodiments, each multi-carrier symbol is scheduled in relation to one of the reference points. In some embodiments, the multi-carrier symbol duration may be configured for each duration of time (e.g. for each subframe or slot), but once configured the multi-carrier symbol duration does not change during that duration of time (e.g. a multi-carrier symbol duration does not change within a subframe or slot).

Figure 12:
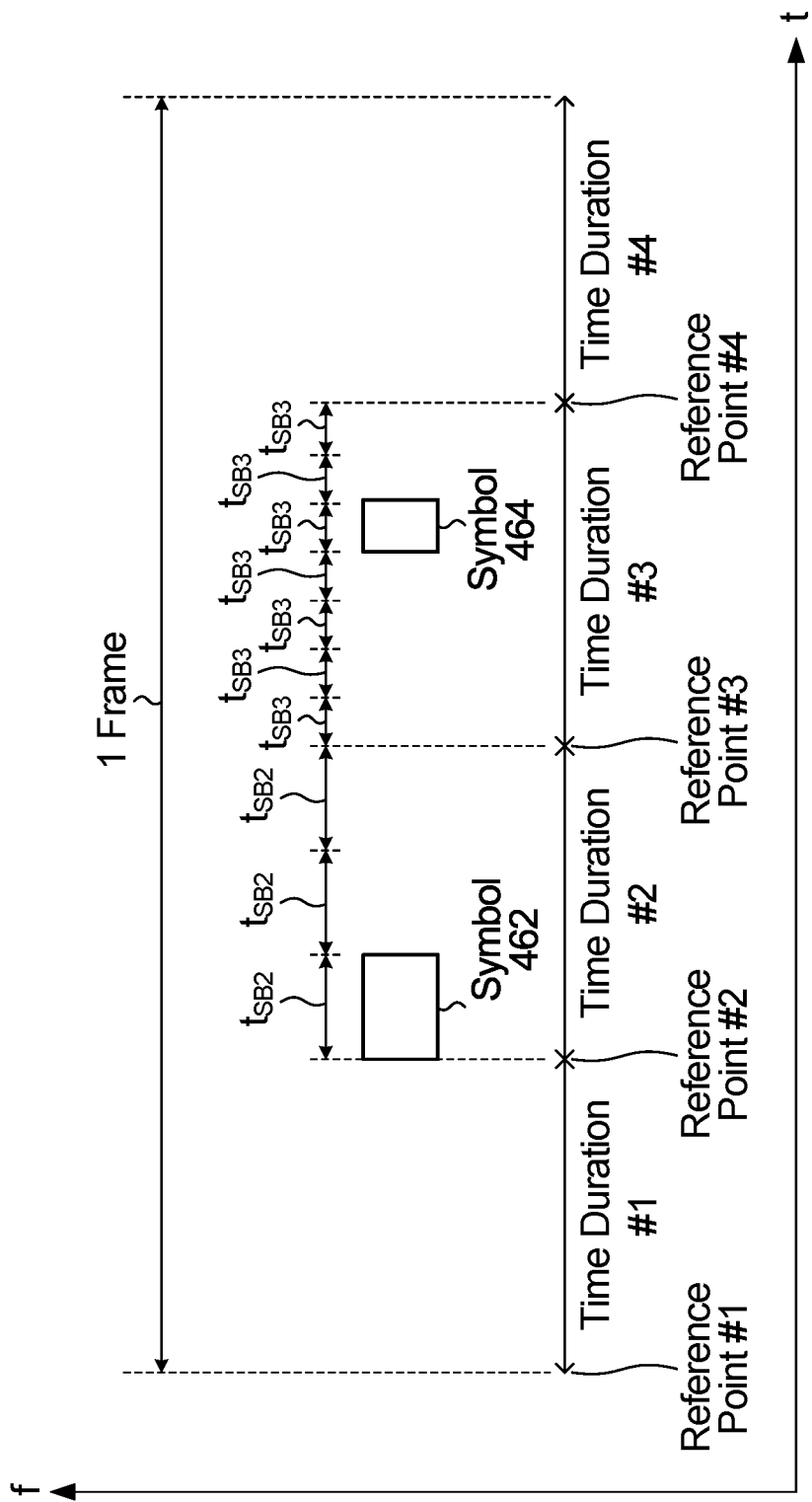
FIG. 12 illustrates a frame partitioned into four time durations, according to another embodiment.

For example, FIG. 12 is the same as FIG. 10, but instead showing transmission of multi-carrier symbols, rather than single-carrier symbol blocks. FIG. 12 illustrates a frame partitioned into four time durations #1 to #4, each beginning at a respective reference point. A time duration may instead be called a time window. The four reference points may each be at the start of a subframe or slot, although this is not necessary, e.g. the concept of subframe and/or slot may not even be defined. The duration of the symbol transmitted in each time duration may be configurable, but within a particular time duration the duration of each symbol is the same. A symbol is scheduled in the time domain, e.g. using DCI or RRC signaling, by indicating an offset from one of the reference points. For example, multi-carrier symbol 462 in FIG. 12 is scheduled in the time domain by indicating to the UE that the symbol 462 is within time duration #2 with no offset, i.e. the symbol 462 begins at the start of time duration #2. As another example, multi-carrier symbol 464 in FIG. 12 is scheduled in the time domain by indicating to the UE that the symbol 464 is within time duration #3 offset five symbol durations from the beginning of the time duration (i.e. offset five symbol durations from reference point #3). The symbol duration for a particular time duration (e.g. $t_{SB2}$ for time duration #2 and $t_{SB3}$ for time duration #3) may be configured for each time duration, with the switch happening at the reference point. In some embodiments, the configurable multi-carrier symbol parameters, e.g. the symbol duration, for each time duration in a frame may be signaled at the start of the frame. These configurable symbol parameters may change on a frame-by-frame basis, or remain the same for a particular number of frames (e.g. only be reconfigured once every 10 frames).

In some embodiments, the time domain resource allocation indicated by a base station may be for one or multiple symbol durations $t_{SB}$, and the time domain resource allocation may use a legacy method, e.g. signal the start and length, possibly listed in one row with one index in a table.

In some embodiments, some or all of the configurable parameters may only change at a reference point. For example, one, some, or all of the following parameters may only change at a reference point: symbol duration $t_{SB}$, CP length $t_{CP}$ of a symbol, data length $t_{Data}$ of a symbol (or an equivalent such as IDFT size N), occupied bandwidth of a symbol, and/or frequency location of the symbol. Therefore, in some embodiments, within each time duration interposed between two reference points, one or more parameters of multi-carrier symbols scheduled within that time duration may be configurable, but the configuration is the same for all multi-carrier symbols scheduled within that time duration. This may allow for simpler implementation because the base station and UE both know that the configuration is the same for all multi-carrier symbols scheduled within a time duration, and so the configuration only needs to be signaled by the base station once for all multi-carrier symbol within a time duration.

Although FIG. 12 shows a frame partitioned into four different time durations, the number of time durations is not limited to four, and may be predefined or configurable. Also, although FIG. 12 shows a frame that is partitioned into different time durations, instead a subframe or a slot may be partitioned into different time durations and scheduled in the same manner as described in relation to FIG. 12, except on a slot-by-slot or subframe-by-subframe basis, rather than on a frame-by-frame basis.

In some embodiments, the multiple reference points in time may be predefined (e.g. in a standard). In some embodiments, for a frame length F, the reference points may be 0 (i.e. frame starting time), $1/10F$, $2/10F$, $3/10F$, $4/10F$, $5/10F$, $6/10F$, $7/10F$, $8/10F$, $9/10F$, $10/10F$, where $10/10F$, is the starting time of the next frame. In some embodiments, for a frame length F, the reference points may be 0 (i.e. frame starting time), 1/NF, 2/NF, ..., N−1/NF, N/NF, where N/NF is the starting time of the next frame, and where N may be IDFT size, but rather is a predefined integer greater than zero, and where N/NF is the starting time of the next frame. N may be predefined or fixed (e.g. in a standard) or signaled from base station by semi-static signaling (e.g. RRC) or dynamic signaling (e.g. DCI). If N=1 then there is a single configuration that is the same for all multi-carrier symbols within a same frame, but that configuration may change frame-to-frame.

In some embodiments, the base station and the UE will use the closest reference point after receiving the related signaling. In other embodiments, the base station will indicate the reference point (or corresponding time duration) for which the new parameters apply. The reference point (or corresponding time duration) may be indicated along with the new parameters that are configured for that time duration corresponding to that reference point.

In some embodiments, there are multiple reference points in time, but the unit of reference point is in sample duration instead of fraction of a frame, subframe, or slot. For example, a reference point in time may be present every 0, $nT_s$, $2nT_s$, ..., $(P-1)nT_s$, $PnT_s$. $T_s$ is the sample duration, e.g. 1/sample frequency, where by way of example the sample frequency may be 1966.08 MHz. n defines the time duration between two reference points as a function of sample duration, e.g. if n=2 then each reference point is two sample durations apart, thereby defining each time duration as two sample durations. In some embodiments, n may be predefined or fixed (e.g. in a standard) or signaled from base station by semi-static signaling (e.g. RRC) or dynamic signaling (e.g. DCI). In some embodiments, n is limited to an integer greater than zero. P is the periodicity at which the set of reference points repeat. P may be an integer or a real number greater than zero. In one example, $PnT_s=1$ ms, i.e. the set of reference points are defined over 1 ms. The set of reference points may repeat/restart every 1 ms.

ADDITIONAL EMBODIMENTS AND METHODS

In some embodiments, the configurable single-carrier symbol block parameters and/or configurable multi-carrier symbol parameters disclosed herein might only apply in relation to UEs that are already connected to the network. For initial access of a UE connecting to the network, the parameters may be predefined, e.g. by a standard. For example, for the synchronization symbol and the preamble in the random access channel for the initial access procedure, if a single carrier waveform is used, then a particular symbol interval, occupied bandwidth, and/or roll off factor may be predefined (e.g. in a standard) for a given frequency band; In some embodiments, for the uplink transmission (e.g. on the physical uplink shared channel (PUSCH)) and/or for the downlink transmission (e.g. on the physical downlink shared channel (PDSCH)) during the initial access procedure, a particular symbol interval, occupied bandwidth, and/or roll off factor can be predefined in a standard or signaled by broadcast signaling or group common signaling. The broadcast signaling may be a main block information (MIB) on a physical broadcast channel (PBCH) or a system information block (SIB). The group common signaling may be DCI in a physical layer downlink control channel (PDCCH) common search space. If a multi-carrier waveform is used, for the synchronization symbol and the preamble in the random access channel for the initial access procedure, then a particular IDFT size and/or CP length may be predefined (e.g. in a standard) for a given frequency band. For PUSCH or PDSCH transmission during an initial access procedure, if a multi-carrier waveform is used, then a particular IDFT size and/or CP length may be signaled by broadcast signaling or group common signaling. The broadcast signaling may be MIB on PBCH or SIB. The group common signaling may be DCI in a PDCCH common search space. In this way, UEs initially accessing the network knows the symbol and/or symbol block parameters at initial access.

In embodiments herein, the frame timing may be replaced with a generic timing, e.g. one time unit timing. In some embodiments, the time unit may be a slot, subframe, frame, super frame, etc. In some embodiments, the time unit can be absolute time, e.g. 1 ms timing, 2 ms timing, 20 ms timing, etc. Therefore, in all embodiments described herein in which frame timing is discussed, the frame timing can instead be replaced with a more general time unit timing, e.g. which may be absolute time and/or slot timing and/or subframe timing and/or super frame timing, etc. For example, in FIGS. 10 and 12, the one frame illustrated may instead be an absolute time (e.g. 10 ms) or one slot or one subframe or one super frame, etc., depending upon the implementation.

The description above discusses configurable multi-carrier symbol and single-carrier symbol block parameters, and the signaling of such parameters, primarily in the context of communications between UEs and base stations, i.e. downlink and uplink. However, the embodiments described above also apply to sidelink communications, i.e. UE-to-UE communications, sometimes referred to as device-to-device (D2D) communications. That is, single-carrier symbol blocks and/or multi-carrier symbols may be transmitted directly from one UE to another UE, and a UE (e.g. one of the two UEs communicating with each other or a master UE) or a base station may signal configurable parameters of the symbol blocks and/or symbols. The configurable parameters may be any of the parameters discussed herein. The D2D communications might or might not be part of a D2D frame used for a transmission from one UE to the other UE.

Figure 13:
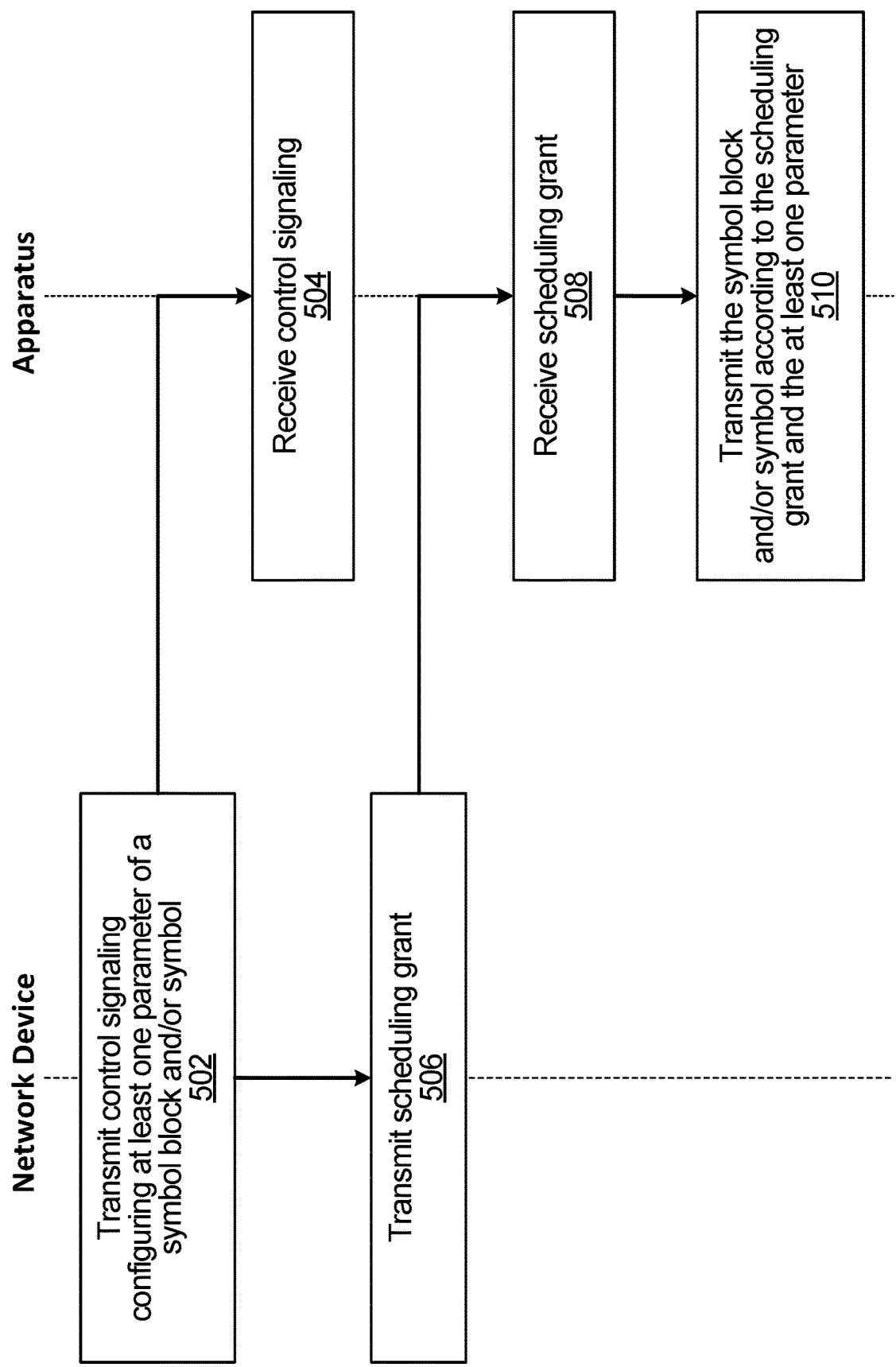
FIGS. 13 and 14 are methods performed by a network device and apparatus, according to various embodiments.

FIG. 13 is a method performed by a network device and apparatus, according to one embodiment. The network device may be base station 170, and the apparatus may be UE 110.

At step 502, the network device transmits control signaling configuring at least one parameter of a single-carrier symbol block and/or a multi-carrier symbol. At step 504, the apparatus receives the control signaling. At step 506, the network device transmits a scheduling grant that schedules the single-carrier symbol block and/or the multi-carrier symbol for transmission. At step 508, the apparatus receives the scheduling grant.

In some embodiments, steps 502 and 506 may be a same single step (e.g. a same single transmission from the network device), in which case steps 504 and 508 would also be a same single step.

At step 510, the apparatus transmits the single-carrier symbol block and/or the multi-carrier symbol according to the scheduling grant and the at least one parameter. The transmission may be to the network device or to another UE. If the scheduling grant is a scheduled a downlink transmission, then step 510 would instead involve the network device transmitting the single-carrier symbol block and/or the multi-carrier symbol to the apparatus according to the scheduling grant and the at least one parameter.

In some embodiments, the at least one parameter includes at least one of: number of data symbols K in the single-carrier symbol block and/or multi-carrier symbol; CP length $t_{CP}$ of the single-carrier symbol block and/or multi-carrier symbol; occupied bandwidth of the single-carrier symbol block and/or multi-carrier symbol; symbol duration $t_s$ of the data symbols of the single-carrier symbol block and/or multi-carrier symbol; roll off factor α of the data symbols of the single-carrier symbol block; frequency location of the single-carrier symbol block and/or multi-carrier symbol; IDFT size N.

In some embodiments, the control signaling is at least one of: DCI; RRC signaling; MAC layer control signaling. In some embodiments, the at least one parameter includes a plurality of parameters, and a first one or more of the plurality of parameters is configured in RRC signaling and a second one or more of the plurality of parameters is configured in DCI.

In some embodiments, a predefined number of different configurations of the at least one parameter is known in advance by the apparatus and the network device, and the control signaling indicates one of the different configurations. In some embodiments, a plurality of bits are used to indicate a selection of a particular configuration of the at least one parameter. In some embodiments, the at least one parameter includes the number of data symbols K in the single-carrier symbol block, and the plurality of bits indicate a particular value of K. In some embodiments, the at least one parameter includes the IDFT size N, and the plurality of bits indicate a particular value of N.

In some embodiments, the at least one parameter comprises the frequency location of the single-carrier symbol block and/or multi-carrier symbol, and the frequency location is signaled as a selection of one of a predefined number of frequency locations known in advance by the network device and the apparatus.

In some embodiments, a time domain is partitioned into a plurality of time windows, and the control signaling configures the at least one parameter to be the same for all single-carrier symbol blocks and/or multi-carrier symbols scheduled in a particular time window. In some embodiments, the scheduling grant schedules the single-carrier symbol block and/or multi-carrier symbol by defining an offset from a reference point associated with the particular time window. In some embodiments, the configuration of the at least one parameter for all single-carrier symbol blocks and/or multi-carrier symbols scheduled in the particular time window is different from the configuration of the at least one parameter for all single-carrier symbol blocks and/or multi-carrier symbols scheduled in another time window of the plurality of time windows.

Figure 14:
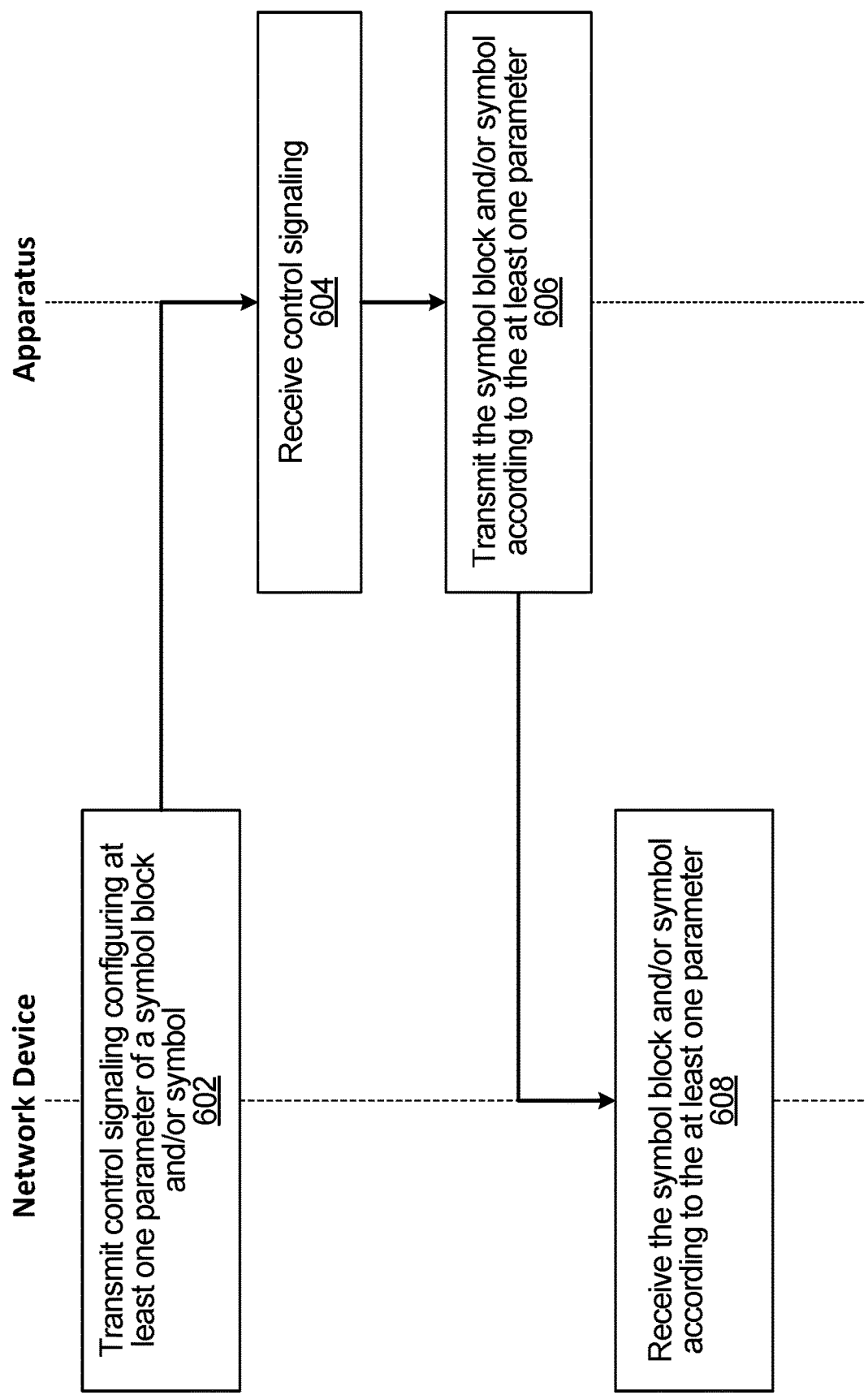

FIG. 14 illustrates a variation of FIG. 13 for the situation in which no scheduling grant is configured, e.g. a grant-free uplink transmission scheme. At step 602, the network device transmits control signaling configuring at least one parameter of a single-carrier symbol block and/or a multi-carrier symbol. At step 604, the apparatus receives the control signaling. At step 606, the apparatus transmits a single-carrier symbol block and/or a multi-carrier symbol according to the at least one parameter. At step 608, the network device receives the single-carrier symbol block and/or a multi-carrier symbol according to the at least one parameter.

Note that transmitting or receiving the single-carrier symbol block and/or the multi-carrier symbol "according to" the at least one parameter means transmitting or receiving the single-carrier symbol block and/or the multi-carrier symbol having the configured at least one parameter. For example, if the at least one parameter is that the symbol duration is a particular length, then a symbol duration of that length is used in the transmission. Transmitting or receiving the single-carrier symbol block and/or the multi-carrier symbol "according to" a scheduling grant means transmitting or receiving the single-carrier symbol block and/or the multi-carrier symbol using the resources indicated in the scheduling grant. For example, if the scheduling grant schedules the transmission at a particular time and/or frequency location, then the transmission is sent at that particular time and/or frequency location. Also, "transmitting or receiving" may generally be referred to as "communicating".

Note that the term "symbol block" has been used herein to help better distinguish from a data symbol. For example, the term "single-carrier symbol block" is used in the description above. However, the term "block" is not necessary and "single-carrier symbol block" may be replaced with "single-carrier symbol". Also, the terms "single-carrier" and "multi-carrier" are used herein to distinguish between a symbol transmitted on a single-carrier waveform and a symbol transmitted on a multi-carrier waveform. However, these terms are used merely to help with the explanation and are not meant to be limiting. For example, "single-carrier symbol" (referred to as "single-carrier symbol block" in the explanation above) may instead be replaced with "first type of symbol" or "symbol of a first type", and "multi-carrier symbol" may instead be replaced with "second type of symbol" or "symbol of a second type". The labels "first type" and "second type" are used to distinguish between the two types of symbols.

Signaling for flexible multi-carrier symbol parameters and/or flexible single-carrier symbol block parameters are disclosed herein.

In some embodiments, variable symbol and/or symbol block duration (including variable CP duration with optionally no CP) may provide flexibility to meet different requirements in different scenarios. However, in some embodiments, there may be high signaling overhead. Therefore, in some embodiments it is considered how to design and generate signaling with reduced overhead to support variable symbol and/or symbol block duration and possibly variable CP duration. One way disclosed is to signal a selection of one configuration from a set of predefined parameter configurations, e.g. like in Tables 1 to 8 described earlier. In some embodiments, when configurable symbol and/or symbol block parameters are changed, it is considered how to ensure the base station and UE know when to use the new symbol and/or symbol block parameters. One way disclosed is the use of reference points, e.g. as described above in relation to FIGS. 10 and 12.

In some embodiments, for a single-carrier waveform transmission, the symbol block parameters that may be signaled possibly include occupied bandwidth, and/or frequency location (e.g. centre frequency), and/or number of data symbols in a symbol block, and/or roll off factor. In some embodiments, a look up table may be used for lower overhead signaling of a combination of different parameters (e.g. Tables 1 to 4 herein).

In some embodiments, for a multi-carrier waveform transmission, the symbol parameters that may be signaled possibly include IDFT size, and/or preamble (e.g. CP) size, and/or occupied bandwidth of the multiple carrier waveform. In some embodiments, a look up table may be used for lower overhead signaling of a combination of different parameters (e.g. Tables 5 to 8 herein).

In some embodiments, reference points may be defined to indicate when there is or can be a change in configured symbol and/or symbol block parameters. In some embodiments, the reference points may be signaled, or a rule may be a predefined and known by both the base station and the UE regarding how to obtain the reference points. In some embodiments, the reference points may instead be predefined, e.g. fixed (such as indicated in a standard).

In view of, and in addition to the above, the following examples are disclosed.

Example 1: A method performed by an apparatus, the method comprising: receiving control signaling configuring at least one parameter of a single-carrier symbol; receiving a scheduling grant that schedules the single-carrier symbol for transmission; transmitting or receiving the single-carrier symbol according to the scheduling grant and the at least one parameter; wherein the at least one parameter comprises at least one of: number of data symbols K in the single-carrier symbol; CP length $t_{CP}$ of the single-carrier symbol; occupied bandwidth of the single-carrier symbol; symbol duration $t_s$ of the data symbols of the single-carrier symbol; roll off factor $\alpha$ of the data symbols of the single-carrier symbol; frequency location of the single-carrier symbol.

Example 2: The method of example 1, wherein the control signaling is at least one of: downlink control information (DCI); radio resource control (RRC) signaling; medium access control (MAC) layer signaling.

Example 3: The method of example 2, wherein the at least one parameter includes a plurality of parameters, and wherein a first one or more of the plurality of parameters is configured in RRC signaling and a second one or more of the plurality of parameters is configured in DCI.

Example 4: The method of example 1, wherein a predefined number of different configurations of the at least one parameter of the single-carrier symbol is known in advance by the apparatus, and wherein the control signaling indicates one of the different configurations.

Example 5: The method of example 4, wherein the at least one parameter includes a plurality of parameters, and wherein the control signaling comprises a plurality of bits that indicate a selection of a particular configuration of the plurality of parameters.

Example 6: The method of example 5, wherein the plurality of parameters includes the number of data symbols K in the single-carrier symbol, and wherein the plurality of bits indicate a particular value of K.

Example 7: The method of any one of examples 1 to 6, wherein the at least one parameter comprises the frequency location of the single-carrier symbol, and wherein the frequency location is signaled as a selection of one of a predefined number of single-carrier frequency locations known in advance by the apparatus.

Example 8: The method of any one of examples 1 to 7, wherein a time domain is partitioned into a plurality of time windows, wherein the single-carrier symbol is a particular single-carrier symbol scheduled in a particular time window of the plurality of time windows, and wherein the control signaling configures the at least one parameter to be the same for all single-carrier symbols scheduled in the particular time window.

Example 9: The method of example 8, wherein the scheduling grant schedules the particular single-carrier symbol by defining an offset from a reference point associated with the particular time window.

Example 10: The method of example 8 or example 9, wherein the configuration of the at least one parameter for all single-carrier symbols scheduled in the particular time window is different from the configuration of the at least one parameter for all single-carrier symbols scheduled in another time window of the plurality of time windows.

Example 11: The method of any one of examples 1 to 10, wherein the control signaling and/or the scheduling grant is received from a network device.

Example 12: The method of any one of examples 1 to 10, wherein the apparatus is a first apparatus, and wherein the control signaling and/or the scheduling grant is received from a second apparatus.

Example 13: The method of example 12, wherein the first apparatus is a first user equipment (UE), and wherein the second apparatus is a second UE different from the first UE.

Example 14: An apparatus configured to perform the method of any one of examples 1 to 13.

Example 15: An apparatus comprising a processor and a memory; the memory including processor-executable instruction that, when executed by the processor, cause the processor to control the apparatus to perform the method of any one of examples 1 to 13.

Example 16: An apparatus comprising: a receiver to receive: control signaling configuring at least one parameter of a single-carrier symbol, and a scheduling grant that schedules the single-carrier symbol for transmission; a transmitter to transmit, or the receiver to receive, the single-carrier symbol according to the scheduling grant and the at least one parameter; wherein the at least one parameter comprises at least one of: number of data symbols K in the single-carrier symbol; CP length $t_{CP}$ of the single-carrier symbol; occupied bandwidth of the single-carrier symbol; symbol duration $t_s$ of the data symbols of the single-carrier symbol; roll off factor $\alpha$ of the data symbols of the single-carrier symbol; frequency location of the single-carrier symbol.

Example 17: A method comprising: transmitting, to an apparatus, control signaling configuring at least one parameter of a single-carrier symbol; transmitting, to the apparatus, a scheduling grant that schedules the single-carrier symbol for transmission; transmitting or receiving the single-carrier symbol according to the scheduling grant and the at least one parameter; wherein the at least one parameter comprises at least one of: number of data symbols K in the single-carrier symbol; CP length $t_{CP}$ of the single-carrier symbol; occupied bandwidth of the single-carrier symbol; symbol duration $t_s$ of the data symbols of the single-carrier symbol; roll off factor $\alpha$ of the data symbols of the single-carrier symbol; frequency location of the single-carrier symbol.

Example 18: The method of example 17, wherein the control signaling is at least one of: downlink control information (DCI); radio resource control (RRC) signaling; medium access control (MAC) layer signaling.

Example 19: The method of example 18, wherein the at least one parameter includes a plurality of parameters, and wherein a first one or more of the plurality of parameters is configured in RRC signaling and a second one or more of the plurality of parameters is configured in DCI.

Example 20: The method of example 17, wherein a predefined number of different configurations of the at least one parameter of the single-carrier symbol is known in advance by the apparatus, and wherein the control signaling indicates one of the different configurations.

Example 21: The method of example 20, wherein the at least one parameter includes a plurality of parameters, and wherein the control signaling comprises a plurality of bits that indicate a selection of a particular configuration of the plurality of parameters.

Example 22: The method of example 21, wherein the plurality of parameters includes the number of data symbols K in the single-carrier symbol, and wherein the plurality of bits indicate a particular value of K.

Example 23: The method of any one of examples 17 to 22, wherein the at least one parameter comprises the frequency location of the single-carrier symbol, and wherein the frequency location is signaled as a selection of one of a predefined number of single-carrier frequency locations known in advance by the apparatus.

Example 24: The method of any one of examples 17 to 23, wherein a time domain is partitioned into a plurality of time windows, wherein the single-carrier symbol is a particular single-carrier symbol scheduled in a particular time window of the plurality of time windows, and wherein the control signaling configures the at least one parameter to be the same for all single-carrier symbols scheduled in the particular time window.

Example 25: The method of example 24, wherein the scheduling grant schedules the particular single-carrier symbol by defining an offset from a reference point associated with the particular time window.

Example 26: The method of example 24 or example 25, wherein the configuration of the at least one parameter for all single-carrier symbols scheduled in the particular time window is different from the configuration of the at least one parameter for all single-carrier symbols scheduled in another time window of the plurality of time windows.

Example 27: The method of any one of examples 17 to 26, wherein the method is performed by network device.

Example 28: The method of any one of examples 17 to 26, wherein the apparatus is a first apparatus, and wherein the method is performed by a second apparatus.

Example 29: The method of example 28, wherein the first apparatus is a first user equipment (UE), and wherein the second apparatus is a second UE different from the first UE.

Example 30: A network device configured to perform the method of any one of examples 17 to 29.

Example 31: A network device comprising a processor and a memory; the memory including processor-executable instruction that, when executed by the processor, cause the processor to control the network device to perform the method of any one of examples 17 to 29.

Example 32: A device comprising: a transmitter to transmit, to an apparatus: control signaling configuring at least one parameter of a single-carrier symbol, and a scheduling grant that schedules the single-carrier symbol for transmission; a receiver to receive, or the transmitter to transmit, the single-carrier symbol according to the scheduling grant and the at least one parameter; wherein the at least one parameter comprises at least one of: number of data symbols K in the single-carrier symbol; CP length $t_{CP}$ of the single-carrier symbol; occupied bandwidth of the single-carrier symbol; symbol duration $t_s$ of the data symbols of the single-carrier symbol; roll off factor $\alpha$ of the data symbols of the single-carrier symbol; frequency location of the single-carrier symbol.

Example 33: The device of example 32, wherein the device is a network device or a user equipment.

Example 34: A method performed by an apparatus, the method comprising: receiving control signaling configuring at least one parameter of a multi-carrier symbol; receiving a scheduling grant that schedules the multi-carrier symbol for transmission; transmitting or receiving the multi-carrier symbol according to the scheduling grant and the at least one parameter; wherein the at least one parameter comprises IDFT size N and/or CP length $t_{CP}$ of the multi-carrier symbol.

Example 35: The method of example 34, wherein the control signaling is at least one of: downlink control information (DCI); radio resource control (RRC) signaling; medium access control (MAC) layer signaling.

Example 36: The method of example 35, wherein the at least one parameter includes a plurality of parameters, and wherein a first one or more of the plurality of parameters is configured in RRC signaling and a second one or more of the plurality of parameters is configured in DCI.

Example 37: The method of any one of examples 34 to 36, wherein a predefined number of different configurations of the at least one parameter of the multi-carrier symbol is known in advance by the apparatus, and wherein the control signaling indicates one of the different configurations.

Example 38: The method of example 37, wherein the control signaling comprises a plurality of bits that indicate a selection of a particular one of the different configurations.

Example 39: The method of example 38, wherein the at least one parameter includes the IDFT size N, and wherein the plurality of bits indicate a particular value of N.

Example 40: The method of any one of examples 34 to 39, wherein a time domain is partitioned into a plurality of time windows, wherein the multi-carrier symbol is a particular multi-carrier symbol scheduled in a particular time window of the plurality of time windows, and wherein the control signaling configures the at least one parameter to be the same for all multi-carrier symbols scheduled in the particular time window.

Example 41: The method of example 40, wherein the scheduling grant schedules the particular multi-carrier symbol by defining an offset from a reference point associated with the particular time window.

Example 42: The method of example 40 or example 41, wherein the configuration of the at least one parameter for all multi-carrier symbols scheduled in the particular time window is different from the configuration of the at least one parameter for all multi-carrier symbols scheduled in another time window of the plurality of time windows.

Example 43: The method of any one of examples 34 to 42, wherein the control signaling and/or the scheduling grant is received from a network device.

Example 44: The method of any one of examples 34 to 42, wherein the apparatus is a first apparatus, and wherein the control signaling and/or the scheduling grant is received from a second apparatus.

Example 45: The method of example 44, wherein the first apparatus is a first user equipment (UE), and wherein the second apparatus is a second UE different from the first UE.

Example 46: An apparatus configured to perform the method of any one of examples 34 to 45.

Example 47: An apparatus comprising a processor and a memory; the memory including processor-executable instruction that, when executed by the processor, cause the processor to control the apparatus to perform the method of any one of examples 34 to 45.

Example 48: An apparatus comprising: a receiver to receive: control signaling configuring at least one parameter of a multi-carrier symbol, and a scheduling grant that schedules the multi-carrier symbol for transmission; a transmitter to transmit, or the receiver to receive, the multi-carrier symbol according to the scheduling grant and the at least one parameter; wherein the at least one parameter comprises IDFT size N and/or CP length $t_{CP}$ of the multi-carrier symbol.

Example 49: A method comprising: transmitting, to an apparatus, control signaling configuring at least one parameter of a multi-carrier symbol; transmitting, to the apparatus, a scheduling grant that schedules the multi-carrier symbol for transmission; transmitting or receiving the multi-carrier symbol according to the scheduling grant and the at least one parameter; wherein the at least one parameter comprises IDFT size N and/or CP length $t_{CP}$ of the multi-carrier symbol.

Example 50: The method of example 49, wherein the control signaling is at least one of: downlink control information (DCI); radio resource control (RRC) signaling; medium access control (MAC) layer signaling.

Example 51: The method of example 50, wherein the at least one parameter includes a plurality of parameters, and wherein a first one or more of the plurality of parameters is configured in RRC signaling and a second one or more of the plurality of parameters is configured in DCI.

Example 52: The method of any one of examples 49 to 51, wherein a predefined number of different configurations of the at least one parameter of the multi-carrier symbol is known in advance by the apparatus, and wherein the control signaling indicates one of the different configurations.

Example 53: The method of example 52, wherein the control signaling comprises a plurality of bits that indicate a selection of a particular one of the different configurations.

Example 54: The method of example 53, wherein the at least one parameter includes the IDFT size N, and wherein the plurality of bits indicate a particular value of N.

Example 55: The method of any one of examples 49 to 54, wherein a time domain is partitioned into a plurality of time windows, wherein the multi-carrier symbol is a particular multi-carrier symbol scheduled in a particular time window of the plurality of time windows, and wherein the control signaling configures the at least one parameter to be the same for all multi-carrier symbols scheduled in the particular time window.

Example 56: The method of example 55, wherein the scheduling grant schedules the particular multi-carrier symbol by defining an offset from a reference point associated with the particular time window.

Example 57: The method of example 55 or example 56, wherein the configuration of the at least one parameter for all multi-carrier symbols scheduled in the particular time window is different from the configuration of the at least one parameter for all multi-carrier symbols scheduled in another time window of the plurality of time windows.

Example 58: The method of any one of examples 49 to 57, wherein the method is performed by network device.

Example 59: The method of any one of examples 49 to 57, wherein the apparatus is a first apparatus, and wherein the method is performed by a second apparatus.

Example 60: The method of example 59, wherein the first apparatus is a first user equipment (UE), and wherein the second apparatus is a second UE different from the first UE.

Example 61: A network device configured to perform the method of any one of examples 49 to 60.

Example 62: A network device comprising a processor and a memory; the memory including processor-executable instruction that, when executed by the processor, cause the processor to control the network device to perform the method of any one of examples 49 to 60.

Example 63: A device comprising: a transmitter to transmit, to an apparatus: control signaling configuring at least one parameter of a multi-carrier symbol, and a scheduling grant that schedules the multi-carrier symbol for transmission; a receiver to receive, or the transmitter to transmit, the multi-carrier symbol according to the scheduling grant and the at least one parameter; wherein the at least one parameter comprises IDFT size N and/or CP length $t_{CP}$ of the multi-carrier symbol.

Example 64: The device of example 63, wherein the device is a network device or a user equipment.

Example 65: A method performed by an apparatus, the method comprising: receiving control signaling configuring at least one parameter of a single-carrier symbol;

transmitting or receiving the single-carrier symbol according to the at least one parameter; wherein the at least one parameter comprises at least one of: number of data symbols K in the single-carrier symbol; CP length $t_{CP}$ of the single-carrier symbol; occupied bandwidth of the single-carrier symbol; symbol duration $t_s$ of the data symbols of the single-carrier symbol; roll off factor α of the data symbols of the single-carrier symbol; frequency location of the single-carrier symbol.

Example 66: The method of example 65, further comprising receiving a scheduling grant that schedules the single-carrier symbol for transmission; and wherein transmitting or receiving the single-carrier symbol according to the at least one parameter comprises: transmitting or receiving the single-carrier symbol according to the scheduling grant and the at least one parameter.

Example 67: The method of example 65, wherein transmitting or receiving the single-carrier symbol according to the at least one parameter comprises: transmitting the single-carrier symbol according to the at least one parameter.

Example 68: The method of example 67, wherein a grant-free uplink transmission is used to transmit the single-carrier symbol.

Example 69: The method of any one of examples 65 to 68, wherein the control signaling is at least one of: downlink control information (DCI); radio resource control (RRC) signaling; medium access control (MAC) layer signaling.

Example 70: The method of example 69, wherein the at least one parameter includes a plurality of parameters, and wherein a first one or more of the plurality of parameters is configured in RRC signaling and a second one or more of the plurality of parameters is configured in DCI.

Example 71: The method of any one of examples 65 to 70, wherein a predefined number of different configurations of the at least one parameter of the single-carrier symbol is known in advance by the apparatus, and wherein the control signaling indicates one of the different configurations.

Example 72: The method of example 71, wherein the at least one parameter includes a plurality of parameters, and wherein the control signaling comprises a plurality of bits that indicate a selection of a particular configuration of the plurality of parameters.

Example 73: The method of example 72, wherein the plurality of parameters includes the number of data symbols K in the single-carrier symbol, and wherein the plurality of bits indicate a particular value of K.

Example 74: The method of any one of examples 65 to 73, wherein the at least one parameter comprises the frequency location of the single-carrier symbol, and wherein the frequency location is signaled as a selection of one of a predefined number of single-carrier frequency locations known in advance by the apparatus.

Example 75: The method of example 66, wherein a time domain is partitioned into a plurality of time windows, wherein the single-carrier symbol is a particular single-carrier symbol scheduled in a particular time window of the plurality of time windows, and wherein the control signaling configures the at least one parameter to be the same for all single-carrier symbols scheduled in the particular time window.

Example 76: The method of example 75, wherein the scheduling grant schedules the particular single-carrier symbol by defining an offset from a reference point associated with the particular time window.

Example 77: The method of example 75 or example 76, wherein the configuration of the at least one parameter for all single-carrier symbols scheduled in the particular time window is different from the configuration of the at least one parameter for all single-carrier symbols scheduled in another time window of the plurality of time windows.

Example 78: The method of any one of examples 65 to 77, wherein the control signaling is received from a network device.

Example 79: The method of any one of examples 65 to 77, wherein the apparatus is a first apparatus, and wherein the control signaling is received from a second apparatus.

Example 80: The method of example 79, wherein the first apparatus is a first user equipment (UE), and wherein the second apparatus is a second UE different from the first UE.

Example 81: An apparatus configured to perform the method of any one of examples 65 to 80.

Example 82: A method comprising: transmitting, to an apparatus, control signaling configuring at least one parameter of a single-carrier symbol; transmitting or receiving the single-carrier symbol according to the at least one parameter; wherein the at least one parameter comprises at least one of: number of data symbols K in the single-carrier symbol; CP length $t_{CP}$ of the single-carrier symbol; occupied bandwidth of the single-carrier symbol; symbol duration $t_s$ of the data symbols of the single-carrier symbol; roll off factor α of the data symbols of the single-carrier symbol; frequency location of the single-carrier symbol.

Example 83: A device configured to perform the method of example 82, wherein the device is a network device or a user equipment.

Example 84: A method performed by an apparatus, the method comprising: receiving control signaling configuring at least one parameter of a multi-carrier symbol; transmitting or receiving the multi-carrier symbol according to the at least one parameter; wherein the at least one parameter comprises IDFT size N and/or CP length $t_{CP}$ of the multi-carrier symbol.

Example 85: The method of example 84, further comprising receiving a scheduling grant that schedules the multi-carrier symbol for transmission; and wherein transmitting or receiving the multi-carrier symbol according to the at least one parameter comprises: transmitting or receiving the multi-carrier symbol according to the scheduling grant and the at least one parameter.

Example 86: The method of example 84, wherein transmitting or receiving the multi-carrier symbol according to the at least one parameter comprises: transmitting the multi-carrier symbol according to the at least one parameter.

Example 87: The method of example 86, wherein a grant-free uplink transmission is used to transmit the multi-carrier symbol.

Example 88: The method of any one of examples 84 to 87, wherein the control signaling is at least one of: downlink control information (DCI); radio resource control (RRC) signaling; medium access control (MAC) layer signaling.

Example 89: The method of example 88, wherein the at least one parameter includes a plurality of parameters, and wherein a first one or more of the plurality of parameters is configured in RRC signaling and a second one or more of the plurality of parameters is configured in DCI.

Example 90: The method of any one of examples 84 to 89, wherein a predefined number of different configurations of the at least one parameter of the multi-carrier symbol is known in advance by the apparatus, and wherein the control signaling indicates one of the different configurations.

Example 91: The method of example 90, wherein the control signaling comprises a plurality of bits that indicate a selection of a particular one of the different configurations.

Example 92: The method of example 91, wherein the at least one parameter includes the IDFT size N, and wherein the plurality of bits indicate a particular value of N.

Example 93: The method of example 85, wherein a time domain is partitioned into a plurality of time windows, wherein the multi-carrier symbol is a particular multi-carrier symbol scheduled in a particular time window of the plurality of time windows, and wherein the control signaling configures the at least one parameter to be the same for all multi-carrier symbols scheduled in the particular time window.

Example 94: The method of example 93, wherein the scheduling grant schedules the particular multi-carrier symbol by defining an offset from a reference point associated with the particular time window.

Example 95: The method of example 93 or example 94, wherein the configuration of the at least one parameter for all multi-carrier symbols scheduled in the particular time window is different from the configuration of the at least one parameter for all multi-carrier symbols scheduled in another time window of the plurality of time windows.

Example 96: The method of any one of examples 84 to 95, wherein the control signaling is received from a network device.

Example 97: The method of any one of examples 84 to 95, wherein the apparatus is a first apparatus, and wherein the control signaling is received from a second apparatus.

Example 98: The method of example 97, wherein the first apparatus is a first user equipment (UE), and wherein the second apparatus is a second UE different from the first UE.

Example 99: An apparatus configured to perform the method of any one of examples 84 to 98.

Example 100: A method comprising: transmitting, to an apparatus, control signaling configuring at least one parameter of a multi-carrier symbol; transmitting or receiving the multi-carrier symbol according to the at least one parameter; wherein the at least one parameter comprises IDFT size N and/or CP length $t_{CP}$ of the multi-carrier symbol.

Example 101: A device configured to perform the method of example 100, wherein the device is a network device or a user equipment.

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

The invention claimed is:

1. A method comprising:
receiving control signaling indicating a set of parameters of a single-carrier symbol block, wherein the set of parameters includes at least one of a number of data symbols in the single-carrier symbol block or a symbol duration of the data symbols of the single-carrier symbol block;
receiving a scheduling grant for transmission or reception of the single-carrier symbol block,
wherein the scheduling grant indicates an offset from a reference point associated with the single-carrier symbol block, and wherein a time window between two adjacent reference points is one or an integer multiple of a sample duration; and
transmitting or receiving the single-carrier symbol block according to the scheduling grant and the set of parameters.

2. The method of claim 1, wherein the set of parameters includes at least one of: a CP length of the single-carrier symbol block, an occupied bandwidth of the single-carrier symbol block, a roll off factor of the data symbols of the single-carrier symbol block, or a frequency location of the single-carrier symbol block.

3. The method of claim 1, wherein there are a plurality of single-carrier symbol blocks within the time window between the two adjacent reference points, and durations for all the plurality of single-carrier symbol blocks are the same.

4. The method of claim 3, wherein durations for single-carrier symbol blocks in different time windows are different.

5. The method of claim 1, wherein the control signaling includes a combination index identifying a set of values for the set of parameters, wherein each value of the set of values corresponds to a different corresponding parameter of the set of parameters respectively, and wherein at least a value of a different set of values identified by a different combination index is different from a value of the set of values corresponding to a same parameter in the set of parameters.

6. The method of claim 5, a plurality of sets of values comprising a first set of values for a plurality of sets of parameters identified by a first combination index and a second set of values for the plurality of sets of parameters identified by a second combination index, the first set of values including a first combination of a first number of data symbols in a first single-carrier symbol block and a first roll off factor of the data symbols in the first single-carrier symbol block, the second set of values including a second combination of a second number of data symbols in a second single-carrier symbol block and a second roll off factor of the data symbols in the second single-carrier symbol block.

7. The method of claim 1, wherein the control signaling is at least one of: downlink control information (DCI), radio resource control (RRC) signaling, or medium access control (MAC) layer signaling.

8. A method comprising:
   transmitting control signaling indicating a set of parameters of a single-carrier symbol block, wherein the set of parameters includes at least one of a number of data symbols in the single-carrier symbol block or a symbol duration of the data symbols of the single-carrier symbol block;
   transmitting a scheduling grant for transmission or reception of the single-carrier symbol block,
   wherein the scheduling grant indicates an offset from a reference point associated with the single-carrier symbol block, and wherein a time window between two adjacent reference points is one or an integer multiple of a sample duration; and
   receiving or transmitting the single-carrier symbol block according to the scheduling grant and the set of parameters.

9. The method of claim 8, wherein the set of parameters includes at least one of: a CP length of the single-carrier symbol block, an occupied bandwidth of the single-carrier symbol block, a roll off factor of the data symbols of the single-carrier symbol block, or a frequency location of the single-carrier symbol block.

10. The method of claim 8, wherein there are a plurality of single-carrier symbol blocks within the time window between the two adjacent reference points, and durations for all the plurality of single-carrier symbol blocks are the same.

11. The method of claim 10, wherein durations for single-carrier symbol blocks in different time windows are different.

12. The method of claim 8, wherein the control signaling includes a combination index identifying a set of values for the set of parameters, wherein each value of the set of values corresponds to a different corresponding parameter of the set of parameters respectively, and wherein at least a value of a different set of values identified by a different combination index is different from a value of the set of values corresponding to a same parameter in the set of parameters.

13. The method of claim 12, a plurality of sets of values comprising a first set of values for a plurality of sets of parameters identified by a first combination index and a second set of values for the plurality of sets of parameters identified by a second combination index, the first set of values including a first combination of a first number of data symbols in a first single-carrier symbol block and a first roll off factor of the data symbols in the first single-carrier symbol block, the second set of values including a second combination of a second number of data symbols in a second single-carrier symbol block and a second roll off factor of the data symbols in the second single-carrier symbol block.

14. The method of claim 8, wherein the control signaling is at least one of: downlink control information (DCI), radio resource control (RRC) signaling, or medium access control (MAC) layer signaling.

15. An apparatus comprising:
   at least one processor; and
   a non-transitory computer readable storage medium storing programming, the programming including instructions that, when executed by the at least one processor, cause the apparatus to perform operations including:
   receiving control signaling indicating a set of parameters of a single-carrier symbol block, wherein the set of parameters includes at least one of a number of data symbols in the single-carrier symbol block or a symbol duration of the data symbols of the single-carrier symbol block;
   receiving a scheduling grant for transmission or reception of the single-carrier symbol block,
   wherein the scheduling grant indicates an offset from a reference point associated with the single-carrier symbol block, and wherein a time window between two adjacent reference points is one or an integer multiple of a sample duration; and
   transmitting or receiving the single-carrier symbol block according to the scheduling grant and the set of parameters.

16. The apparatus of claim 15, wherein the set of parameters includes at least one of: a CP length of the single-carrier symbol block, an occupied bandwidth of the single-carrier symbol block, a roll off factor of the data symbols of the single-carrier symbol block, or a frequency location of the single-carrier symbol block.

17. The apparatus of claim 15, wherein there are a plurality of single-carrier symbol blocks within the time window between the two adjacent reference points, and durations for all the plurality of single-carrier symbol blocks are the same.

18. The apparatus of claim 17, wherein durations for single-carrier symbol blocks in different time windows are different.

19. The apparatus of claim 15, wherein the control signaling includes a combination index identifying a set of values for the set of parameters, wherein each value of the set of values corresponds to a different corresponding parameter of the set of parameters respectively, and wherein at least a value of a different set of values identified by a different combination index is different from a value of the set of values corresponding to a same parameter in the set of parameters.

20. The apparatus of claim 15, wherein the control signaling is at least one of: downlink control information (DCI), radio resource control (RRC) signaling, or medium access control (MAC) layer signaling.

* * * * *